(12) United States Patent
Park et al.

(10) Patent No.: US 11,201,654 B2
(45) Date of Patent: *Dec. 14, 2021

(54) METHOD OF TRANSMITTING/RECEIVING CHANNEL STATE INFORMATION REFERENCE SIGNAL IN WIRELESS COMMUNICATION SYSTEM AND DEVICE FOR SAME

(71) Applicant: LG ELECTRONICS INC., Seoul (KR)

(72) Inventors: Jonghyun Park, Seoul (KR); Kijun Kim, Seoul (KR); Haewook Park, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 16/810,300

(22) Filed: Mar. 5, 2020

(65) Prior Publication Data

US 2020/0212982 A1 Jul. 2, 2020

Related U.S. Application Data

(63) Continuation of application No. 15/773,129, filed as application No. PCT/KR2016/012538 on Nov. 2, 2016, now Pat. No. 10,601,481.

(Continued)

(51) Int. Cl.
*H04B 7/06* (2006.01)
*H04L 5/00* (2006.01)
(Continued)

(52) U.S. Cl.
CPC ............ *H04B 7/0626* (2013.01); *H04L 5/00* (2013.01); *H04L 5/0048* (2013.01); *H04L 5/14* (2013.01);
(Continued)

(58) Field of Classification Search
USPC .................................. 375/262; 370/329, 252
See application file for complete search history.

(56) References Cited

U.S. PATENT DOCUMENTS

| 7,016,651 | B1 | 3/2006 | Narasimhan | .......... H04L 1/0001 370/210 |
| 8,681,651 | B2 | 3/2014 | Bhattad | ................. H04L 5/0032 370/246 |

(Continued)

OTHER PUBLICATIONS

Pantech, "Considerations on CSI-RS transmission in TDD special subframes", 3GPP TSG RAN WG1 Meeting #74, Aug. 19-23, 2013, R1-133444.

(Continued)

*Primary Examiner* — Eva Y Puente
(74) *Attorney, Agent, or Firm* — Dentons US LLP

(57) ABSTRACT

Disclosed herein is a method of receiving a channel state information-reference signal (CSI-RS) of a user equipment (UE) in a wireless communication system, including receiving CSI-RS resource information about a CSI-RS resource location having the CSI-RS mapped thereto, from a base station and receiving the CSI-RS through a CSI-RS resource at a location determined based on the CSI-RS resource information, wherein the CSI-RS resource information includes an index value indicating a location of a CSI-RS resource element where the CSI-RS is transmitted, a period and offset information of a subframe where the CSI-RS is transmitted, and information on a number of antenna ports where the CSI-RS is transmitted, wherein when the index value indicates locations of different CSI-RS resource elements by types of the subframe where the CSI-RS is transmitted and the CSI-RS is set to be transmitted alternately through a normal subframe and a special subframe within one wireless frame, the location of the CSI-RS resource is determined in additional consideration of a type (Continued)

of the subframe in addition to the CSI-RS resource information.

18 Claims, 13 Drawing Sheets

Related U.S. Application Data

(60) Provisional application No. 62/250,488, filed on Nov. 3, 2015.

(51) Int. Cl.
*H04L 5/14* (2006.01)
*H04W 72/04* (2009.01)
*H04J 11/00* (2006.01)
*H04L 27/26* (2006.01)

(52) U.S. Cl.
CPC ....... *H04L 5/1469* (2013.01); *H04W 72/0446* (2013.01); *H04J 11/00* (2013.01); *H04L 27/2602* (2013.01)

(56) References Cited

U.S. PATENT DOCUMENTS

| 8,774,226 | B2 | 7/2014 | Guo | H04L 1/0026 370/332 |
| 9,313,774 | B2 | 4/2016 | Abe | H04W 72/04 |
| 10,601,481 | B2* | 3/2020 | Park | H04L 5/14 |
| 2013/0044728 | A1 | 2/2013 | Guo et al. | |
| 2013/0170376 | A1* | 7/2013 | Dinan | H04L 5/0053 370/252 |
| 2014/0036810 | A1* | 2/2014 | Harrison | H04W 72/0413 370/329 |
| 2014/0126485 | A1* | 5/2014 | Chen | H04L 5/0094 370/329 |
| 2014/0126496 | A1 | 5/2014 | Sayana et al. | |
| 2014/0198675 | A1 | 7/2014 | He et al. | |
| 2015/0139105 | A1 | 5/2015 | Guo | H04W 72/04 370/329 |
| 2015/0244508 | A1 | 8/2015 | Kim et al. | |
| 2015/0318973 | A1* | 11/2015 | Wang | H04L 5/0023 370/329 |
| 2016/0278117 | A1* | 9/2016 | Sahlin | H04W 72/0446 |
| 2018/0160409 | A1 | 6/2018 | Park | H04W 72/12 |
| 2018/0198499 | A1 | 7/2018 | Park | H04B 7/04 |
| 2018/0309556 | A1* | 10/2018 | Chen | H04W 72/0446 |

OTHER PUBLICATIONS

Catt, "Introduction of CSI-RS in DwPTS for TDD", 3GPP TSG RAN WG1 Meeting #82bis, Oct. 5-9, 2015, R1-155203.
Catt et al., "CSI-RS in DwPTS", R1-156145, 3GPP TSG-RAN1 #82bis, Malmo, Sweden, Oct. 5-9, 2015, see slides 2-4; and table 6.10.5.2-1.
Samsung, "CSI-RS transmission on special subframes", R1-155484, 3GPP TSG RAN WG1 #82bis, Malmo, Sweden, Oct. 5-9, 2015, see section 2.
Alcatel-Lucent Shanghai Bell et al., "New CSI-RS Port Design for 3D Memo", R1-155247, 3GPP TSG RAN WG1 Meeting #82b, Malmo, Sweden, Oct. 5-9, 2015, see section 2; and figures 1, 2.

* cited by examiner

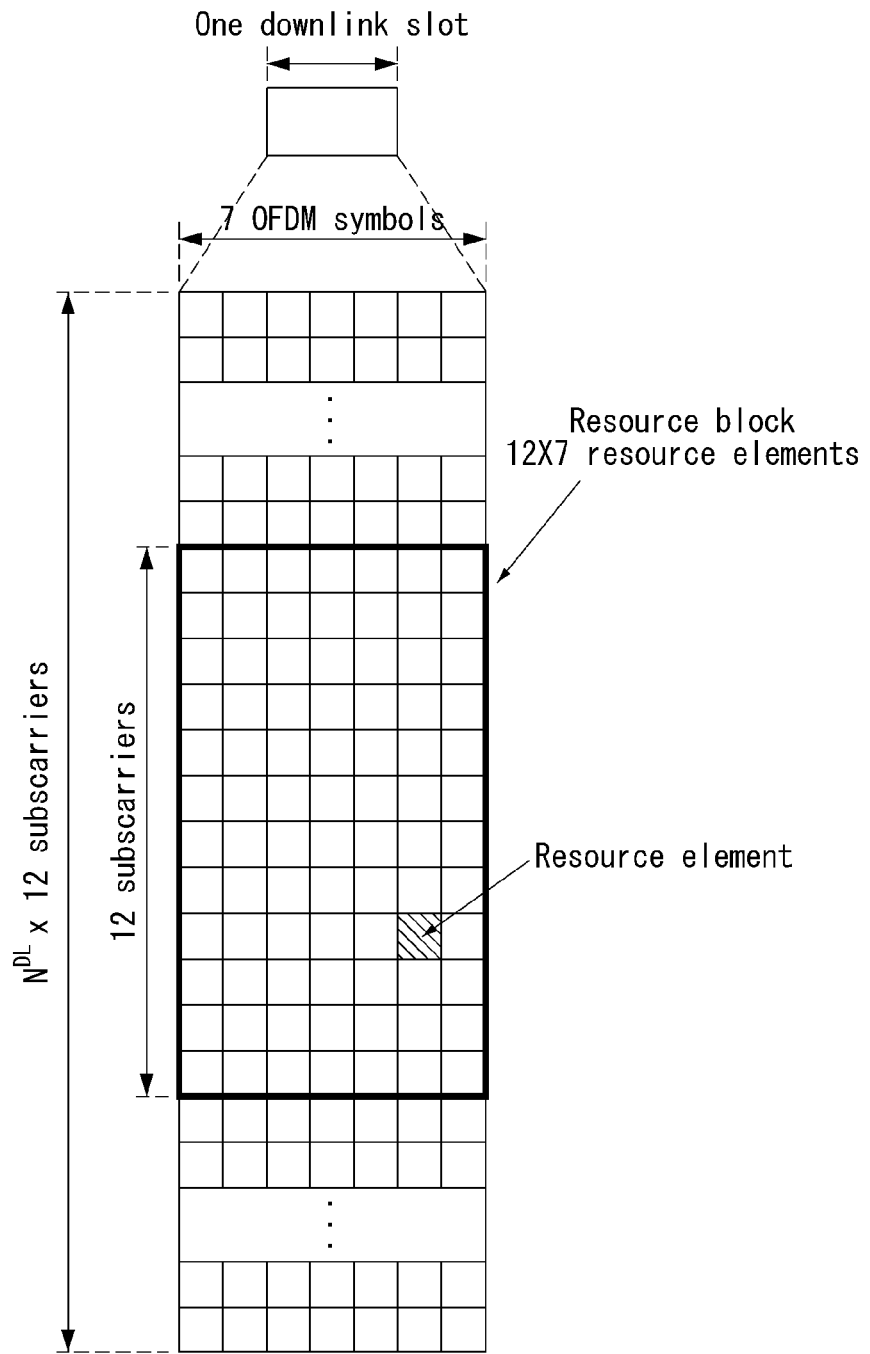
[Fig. 2]

[Fig. 3]
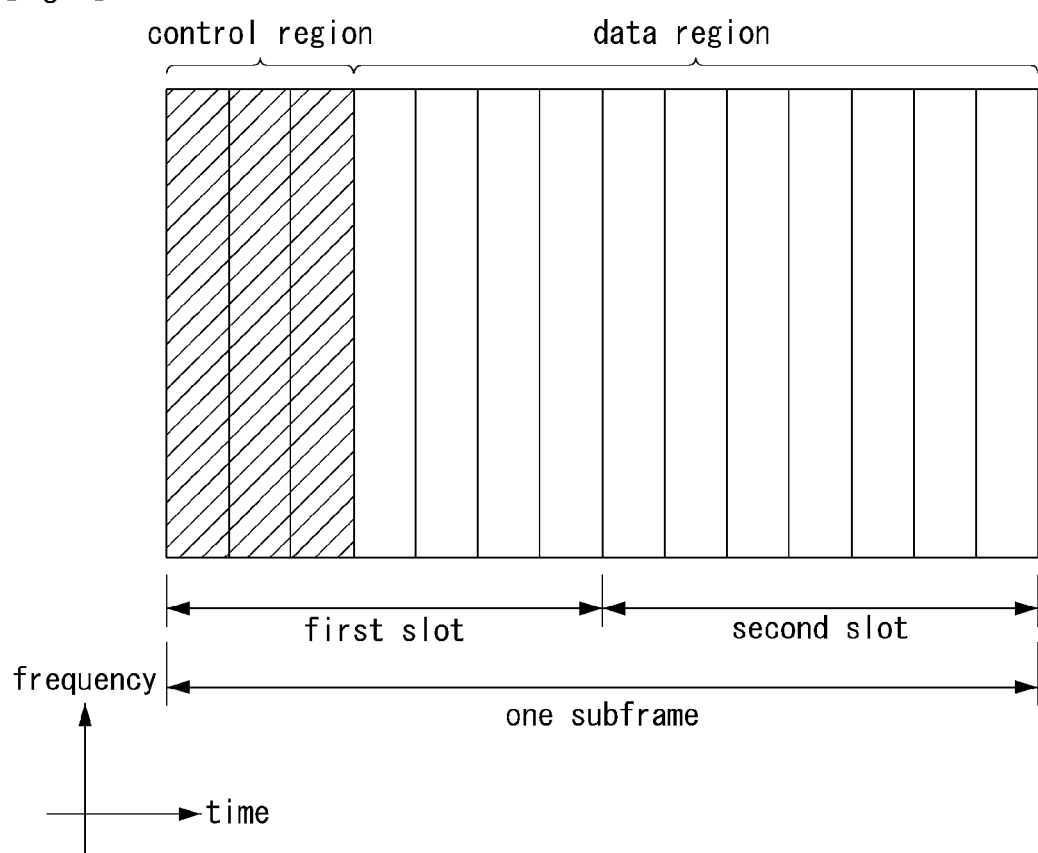

[Fig. 4]
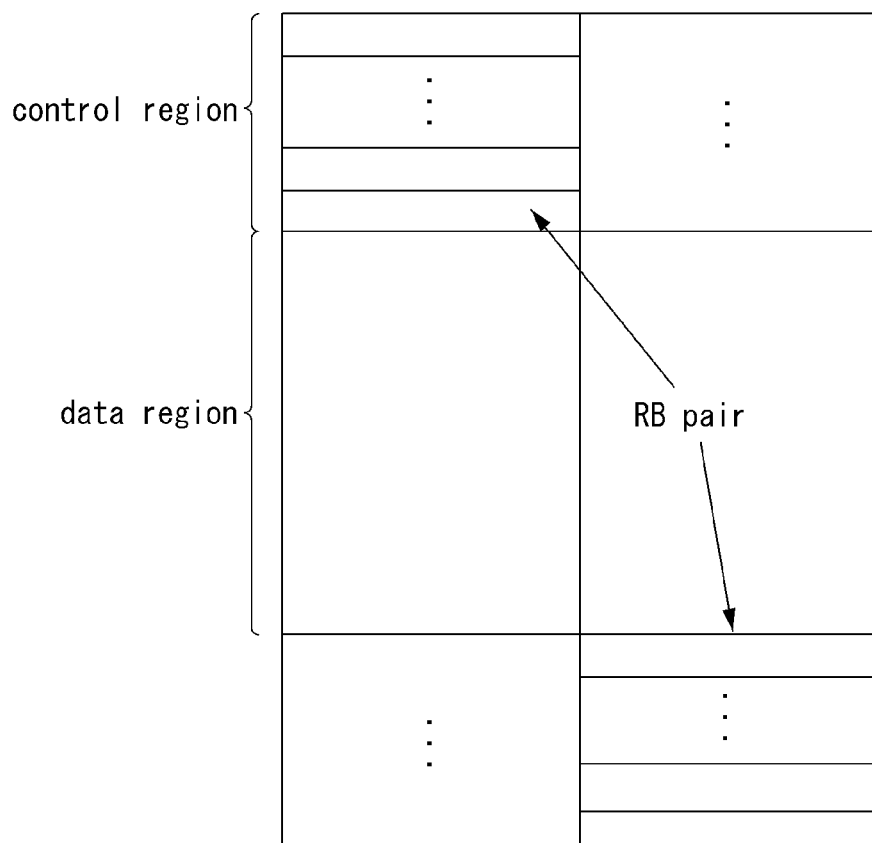

[Fig. 5]
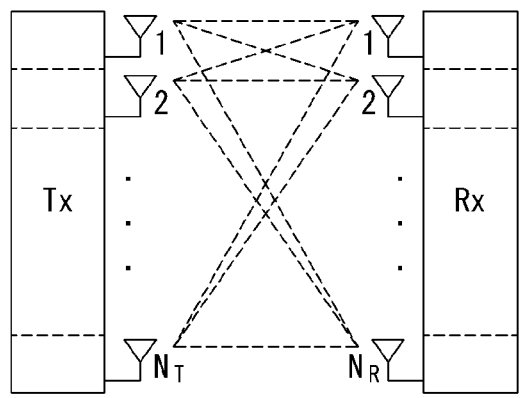
[Fig. 6]
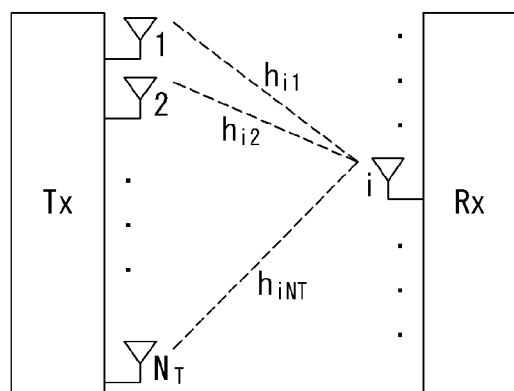

[Fig. 7]
(a) 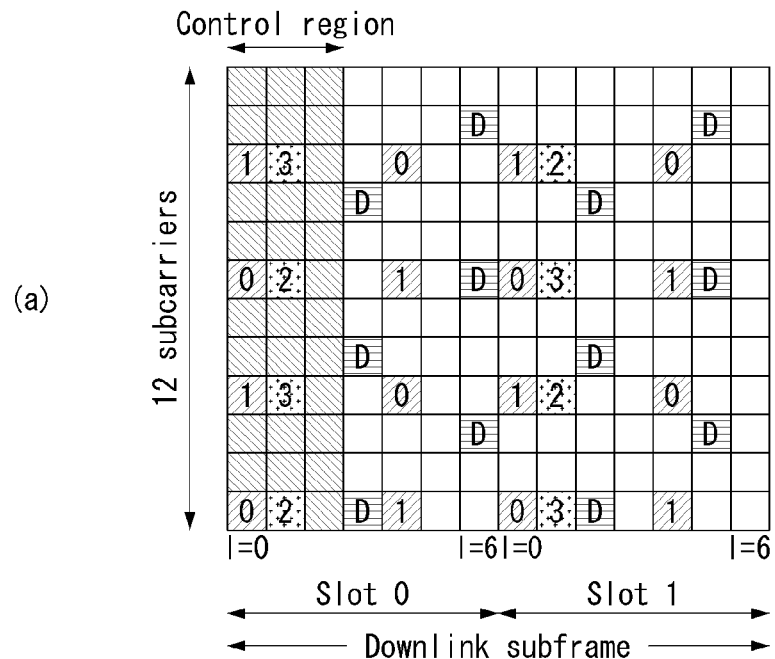
(b) 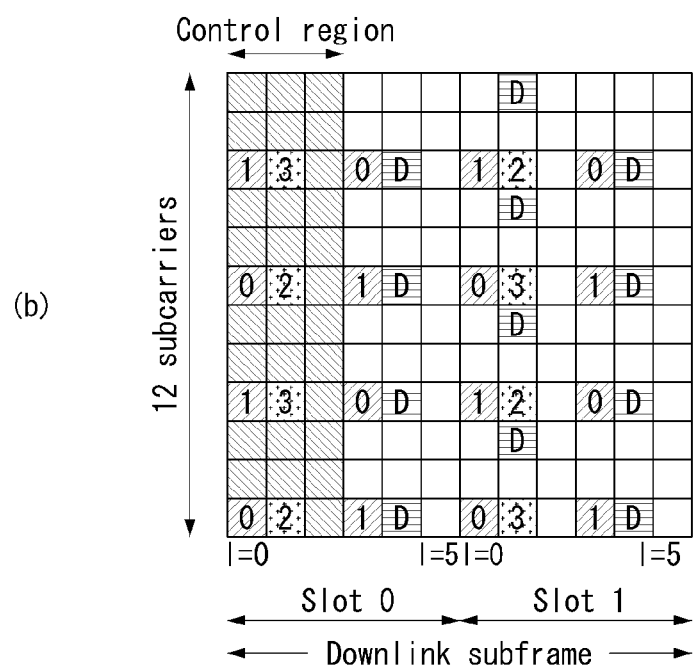

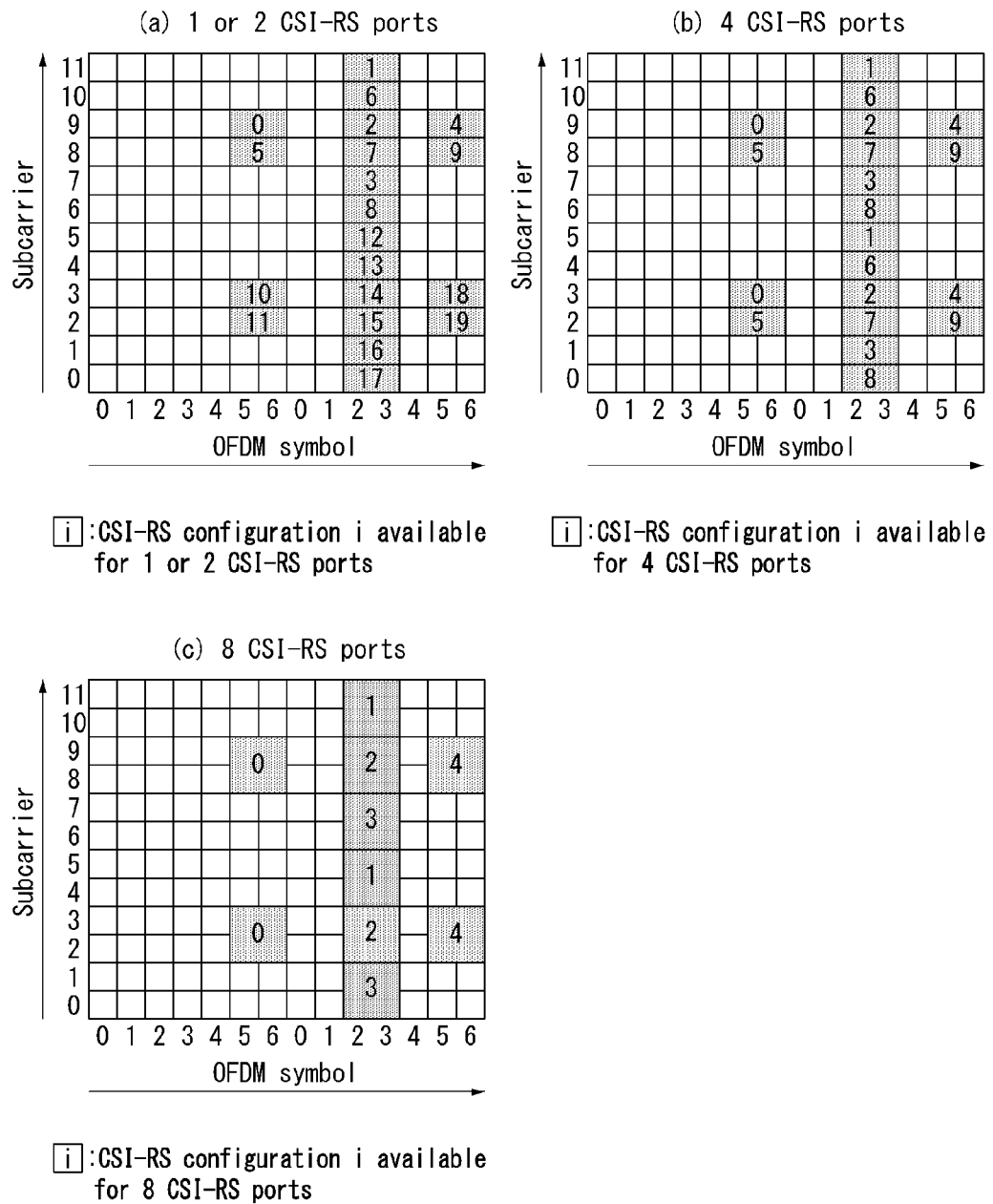

[Fig. 9]

1 or 2 ports (a)

4 ports (b)

8 ports (c)

[Fig. 10]
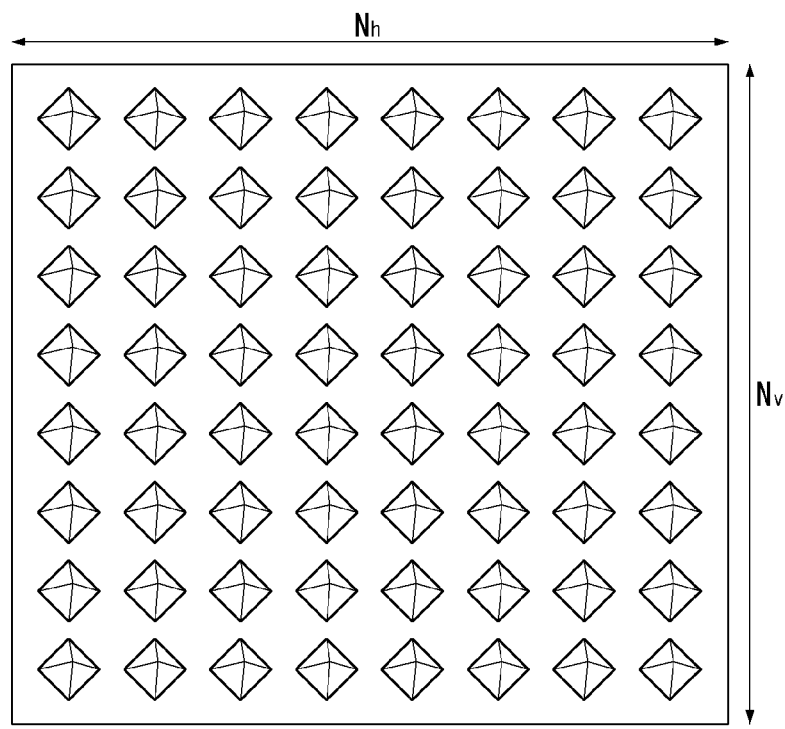
[Fig. 11]
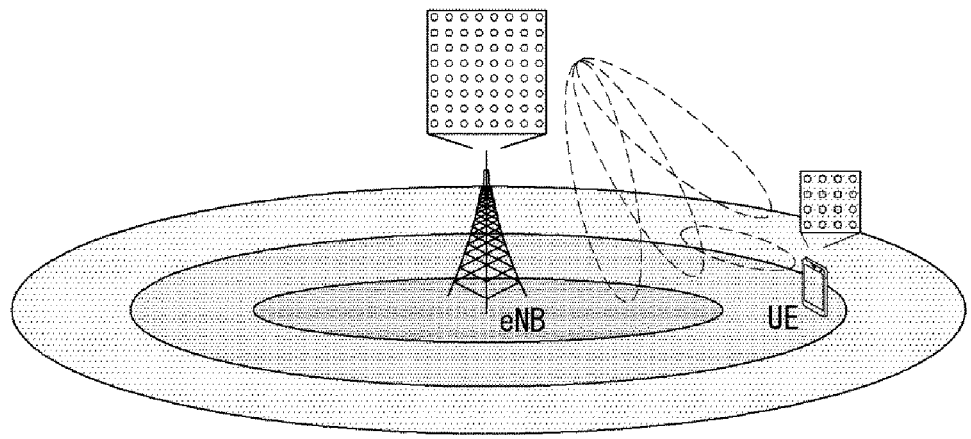

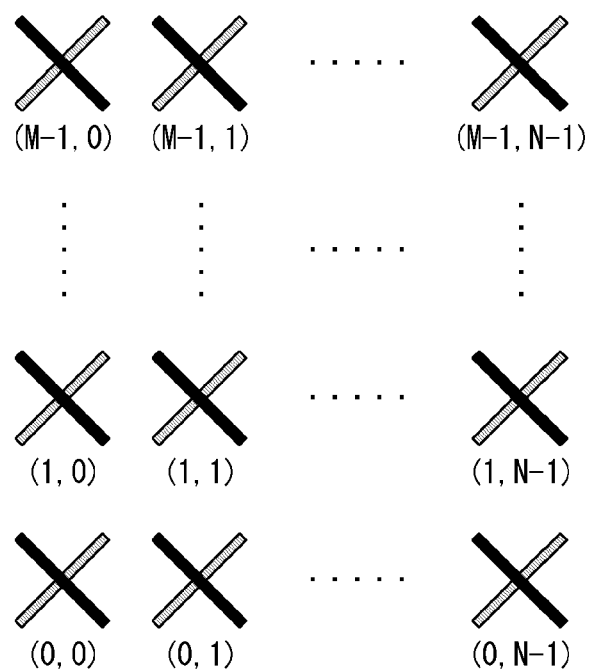
[Fig. 12]

【Fig. 13】
(a)
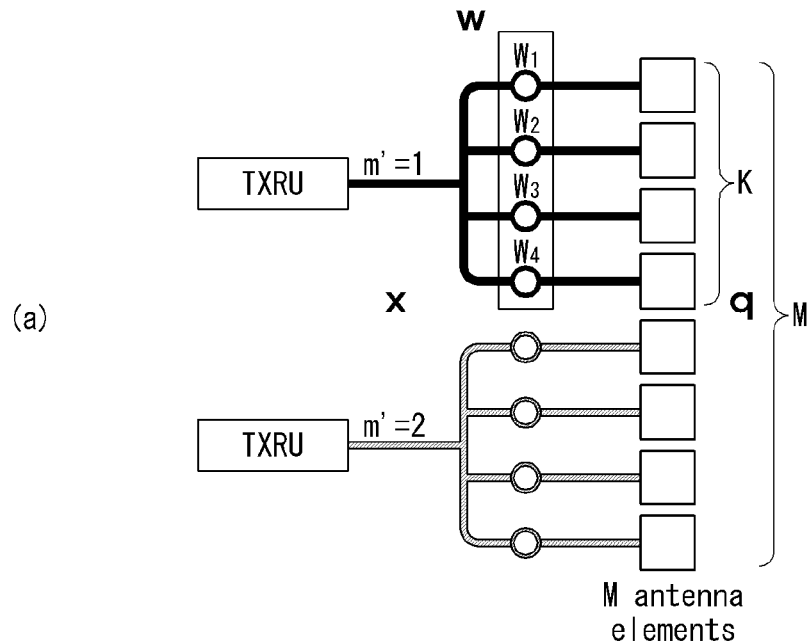
(b)
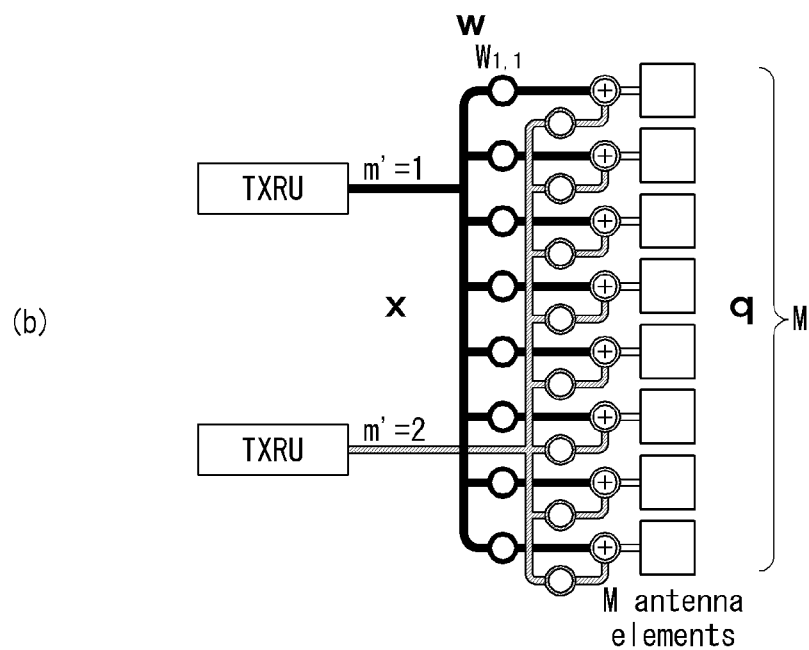

[Fig. 14]
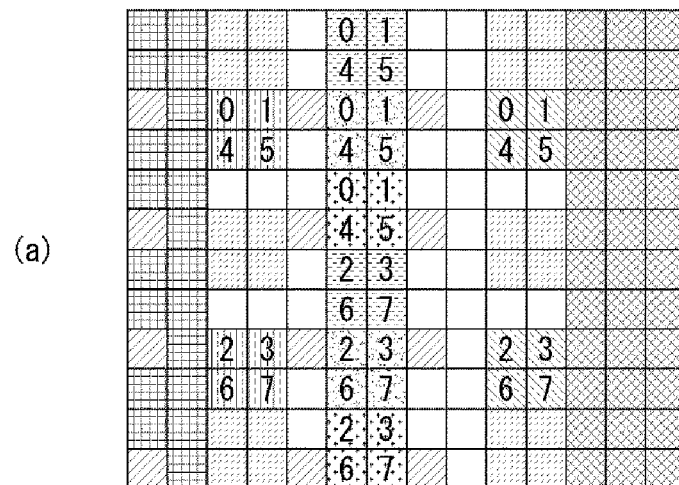
(a)
(b)

[Fig. 15]
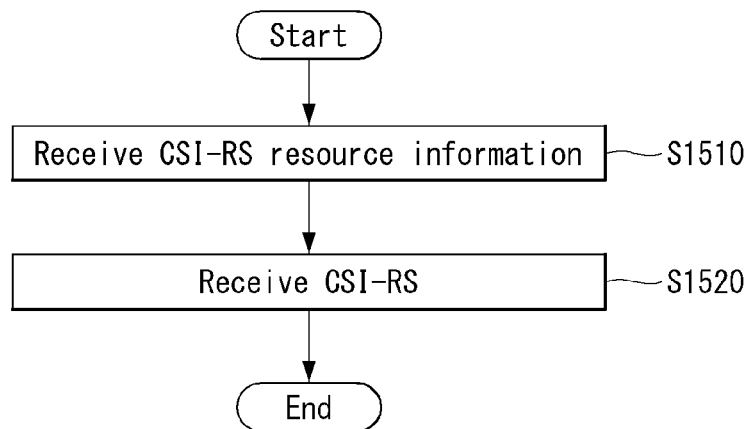
[Fig. 16]
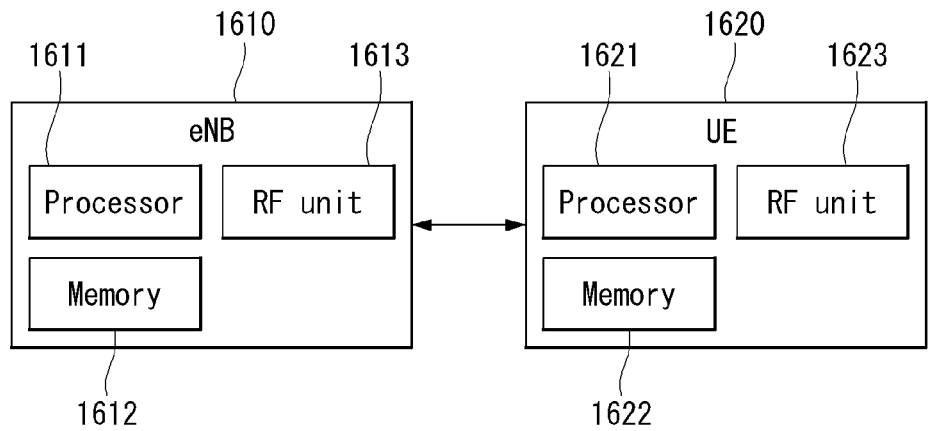

METHOD OF TRANSMITTING/RECEIVING CHANNEL STATE INFORMATION REFERENCE SIGNAL IN WIRELESS COMMUNICATION SYSTEM AND DEVICE FOR SAME

CROSS-REFERENCE TO RELATED APPLICATIONS

This application is a continuation application of U.S. patent application Ser. No. 15/773,129, filed on May 2, 2018, which is the National Stage filing under 35 U.S.C. 371 of International Application No. PCT/KR2016/012538, filed on Nov. 2, 2016, which claims the benefit of U.S. Provisional Application No. 62/250,488, filed on Nov. 3, 2015, the contents of which are all hereby incorporated by reference herein in their entirety.

TECHNICAL FIELD

The present invention relates to a wireless communication system and, more particularly, to a method of transmitting/receiving a channel state information-reference signal (CSI-RS) signal and an apparatus for supporting the same.

BACKGROUND ART

Mobile communication systems have been developed to provide voice services, while guaranteeing user activity. Service coverage of mobile communication systems, however, has extended even to data services, as well as voice services, and currently, an explosive increase in traffic has resulted in shortage of resource and user demand for a high speed service, requiring advanced mobile communication systems.

The requirements of the next-generation mobile communication system may include supporting huge data traffic, a remarkable increase in the transfer rate of each user, the accommodation of a significantly increased number of connection devices, very low end-to-end latency, and high energy efficiency. To this end, various techniques, such as small cell enhancement, dual connectivity, massive multiple input multiple output (MIMO), in-band full duplex, non-orthogonal multiple access (NOMA), supporting super-wide band, and device networking, have been researched.

DISCLOSURE

Technical Problem

An object of the present invention is to propose a method for accurately and efficiently receiving, by a user equipment, CSI-RSs transmitted from different CSI-RS resource locations depending on the subframe type.

The technical objects of the present invention are not limited to the technical objects mentioned above, and other non-mentioned technical objects would be clearly understood by one of ordinary skill in the art based on the disclosure below.

Technical Solution

According to an aspect of the present invention, there is provided a method of receiving CSI-RS resource information about a CSI-RS resource location having the CSI-RS mapped thereto, from a base station and receiving the CSI-RS through a CSI-RS resource at a location determined based on the CSI-RS resource information, wherein the CSI-RS resource information includes an index value indicating a location of a CSI-RS resource element where the CSI-RS is transmitted, a period and offset information of a subframe where the CSI-RS is transmitted, and information on a number of antenna ports where the CSI-RS is transmitted, wherein, when the index value indicates locations of different CSI-RS resource elements by types of the subframe where the CSI-RS is transmitted and the CSI-RS is set to be transmitted alternately through a normal subframe and a special subframe within one wireless frame, the location of the CSI-RS resource is determined in additional consideration of a type of the subframe in addition to the CSI-RS resource information.

Furthermore, a case that the CSI-RS is set to be transmitted alternately through the normal subframe and the special subframe in the one wireless frame may be a case that a uplink-downlink configuration is set to 3, 4 or 5, and a transmission period of the CSI-RS is set to 5 ms.

Furthermore, when the subframe where the CSI-RS is transmitted is the normal subframe, the index value may indicate a location of a first CSI-RS resource element, and when the subframe where the CSI-RS is transmitted is the special subframe, the index value may indicate a location of a second CSI-RS resource element, wherein the location of the second CSI-RS resource element is defined as a time-shifted form from the location of the first CSI-RS resource element.

Furthermore, the location of the second CSI-RS resource element may be defined as a form time-shifted by a length of 4 OFDM symbols from the location of the first CSI-RS resource element.

Furthermore, the CSI-RS may be transmitted only through a special subframe of a length equal to or greater than a predetermined length.

Furthermore, the CSI-RS may not be transmitted at special subframe configurations 0, 5 and 9.

Furthermore, the normal subframe or the special subframe where the CSI-RS is transmitted may correspond to a subframe to which a normal cyclic prefix has been applied.

According to another aspect of the present invention, there is provided a user equipment (UE) for receiving a channel state information-reference signal (CSI-RS) in a wireless communication system, including a radio frequency (RF) unit configured to transmit and receive a wireless signal and a processor configured to control the RF unit, wherein the user equipment is configured to receive CSI-RS resource information about a CSI-RS resource location having the CSI-RS mapped thereto and receive the CSI-RS through a CSI-RS resource at a location determined based on the CSI-RS resource information, wherein the CSI-RS resource information includes an index value indicating a location of a CSI-RS resource element where the CSI-RS is transmitted, a period and offset information of a subframe where the CSI-RS is transmitted, and information on a number of antenna ports where the CSI-RS is transmitted, wherein, when the index value indicates locations of different CSI-RS resource elements by types of the subframe where the CSI-RS is transmitted and the CSI-RS is set to be transmitted alternately through a normal subframe and a special subframe within one wireless frame, the location of the CSI-RS resource is determined in additional consideration of a type of the subframe in addition to the CSI-RS resource information.

Furthermore, a case that the CSI-RS is set to be transmitted alternately through the normal subframe and the special subframe in the one wireless frame may be a case that a uplink-downlink configuration is set to 3, 4 or 5, and a transmission period of the CSI-RS is set to 5 ms.

Furthermore, when the subframe where the CSI-RS is transmitted is the normal subframe, the index value may indicate a location of a first CSI-RS resource element, and when the subframe where the CSI-RS is transmitted is the special subframe, the index value may indicate a location of a second CSI-RS resource element, wherein the location of the second CSI-RS resource element is defined as a time-shifted form from the location of the first CSI-RS resource element.

Furthermore, the location of the second CSI-RS resource element may be defined as a form time-shifted by a length of 4 OFDM symbols from the location of the first CSI-RS resource element.

Furthermore, the CSI-RS may be transmitted only through a special subframe of a length equal to or greater than a predetermined length.

Furthermore, the CSI-RS may not be transmitted at special subframe configurations 0, 5 and 9.

Furthermore, the normal subframe or the special subframe where the CSI-RS is transmitted may correspond to a subframe to which a normal cyclic prefix has been applied.

Advantageous Effects

According to embodiments of the present invention, a user equipment may accurately and smoothly receive and measure CSI-RS and report/feedback CSI to a base station.

Furthermore, as CSI-RS transmission in a special subframe is allowed, if the user equipment does not know the type of the subframe in which CSI-RS is transmitted, the user equipment cannot know the accurate location of the CSI-RS resource, which is ambiguity/problem, but according to embodiments of the present invention, such ambiguity/problem can be resolved.

Furthermore, according to embodiments of the present invention, complexity of signaling for instructing CSI-RS resource location is reduced, and a base station can instruct differently defined CSI-RS transmission locations/patterns by subframe types while providing one index value to the UE.

Furthermore, CSI-RS pattern which is mapped to the special subframe according to the embodiments of the present invention is reused and defined, and thus it is possible to efficiently draw/use CSI-RS pattern without significantly changing a legacy system. Furthermore, there is an effect of maintaining compatibility between a new system and the legacy system.

The effects obtainable in the present invention are not limited to the above-mentioned effects, and other non-mentioned effects may be clearly understood to one of ordinary skill in the art in one of ordinary skill in the art from the disclosure below.

DESCRIPTION OF DRAWINGS

The accompanying drawings, which are included herein as a part of a description in order to help understanding of the present invention, provide embodiments of the present invention, and describe the technical features of the present invention with the description below.

FIG. 2 is a diagram illustrating a resource grid for a downlink slot in a wireless communication system to which an embodiment of the present invention may be applied.

FIG. 3 illustrates the structure of a downlink subframe in a wireless communication system to which an embodiment of the present invention may be applied.

FIG. 4 illustrates the structure of an uplink subframe in a wireless communication system to which an embodiment of the present invention may be applied.

FIG. 5 shows the configuration of a known MIMO communication system.

FIG. 6 is a diagram showing a channel from a plurality of transmission antennas to a single reception antenna.

FIG. 7 illustrates a reference signal pattern mapped to a downlink resource block pair in the wireless communication system to which an embodiment of the present invention may be applied.

FIG. 8 is a diagram illustrating resources to which reference signals are mapped in a wireless communication system to which the present invention may be applied.

FIG. 9 is a diagram illustrating resources to which reference signals are mapped in a wireless communication system to which the present invention may be applied FIG. 10 illustrates a 2-dimensional active antenna system having 64 antenna elements, in a wireless communication system to which the present invention may be applied.

FIG. 11 illustrates a system that a base station or terminal has a plurality of transmission/reception antennas capable of forming an AAS-based 3D (3-Dimension) beam, in a wireless communication system to which the present invention may applied.

FIG. 12 illustrates a two-dimensional antenna system with cross polarization in a wireless communication system to which the present invention may be applied.

FIG. 13 illustrates a transceiver unit model in a wireless communication system to which the present invention may be applied.

FIG. 14 illustrates a resource of a special subframe to which CSI-RS is mapped in a wireless communication system to which the present invention may be applied.

FIG. 15 is a flowchart illustrating a method of receiving, by a user equipment, CSI-RS according to an embodiment of the present invention.

FIG. 16 illustrates a block diagram of a wireless communication device according to an embodiment of the present invention.

BEST MODE FOR INVENTION

Figure 1:
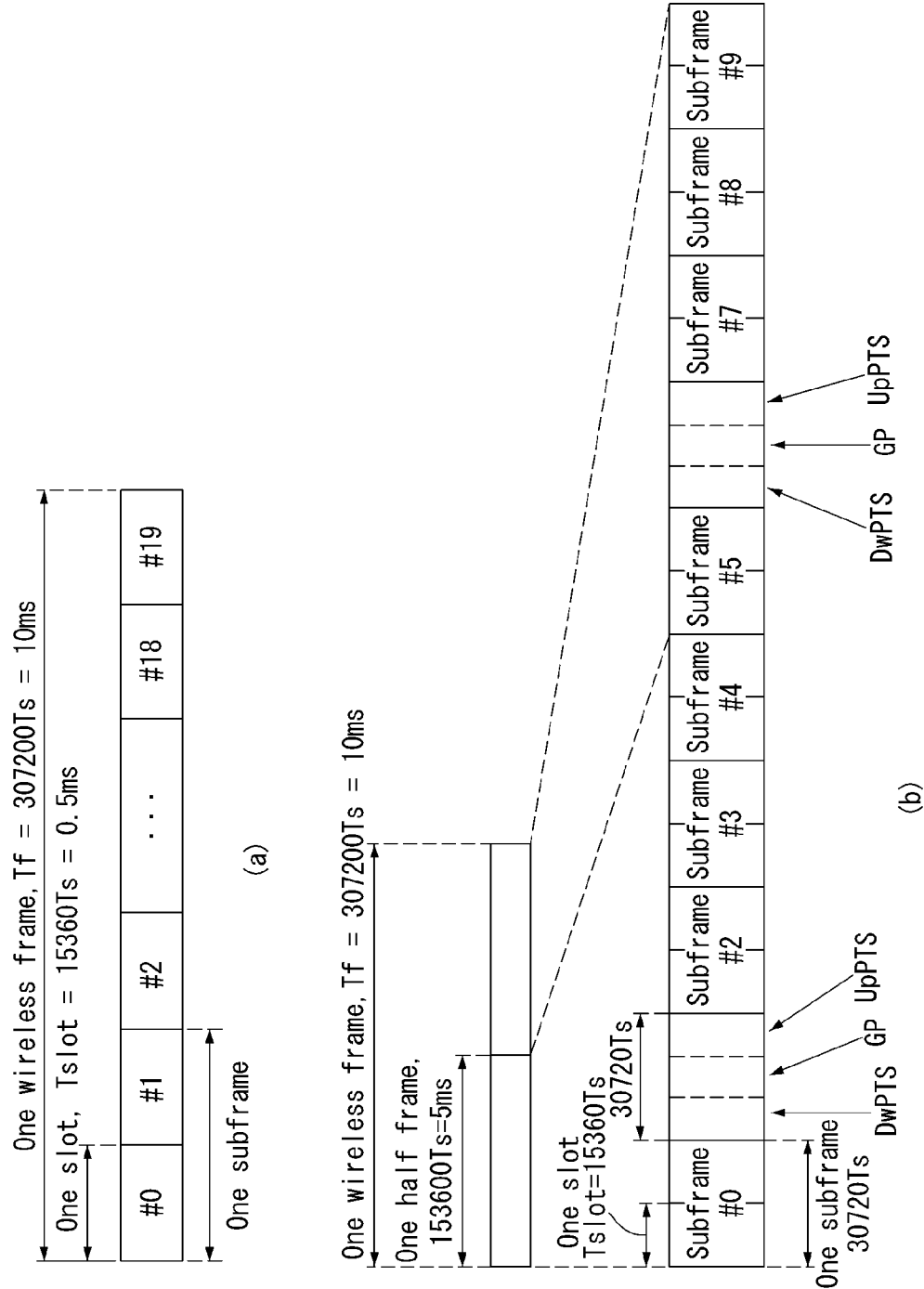
FIG. 1 illustrates the structure of a radio frame in a wireless communication system to which an embodiment of the present invention may be applied.

Some embodiments of the present invention are described in detail with reference to the accompanying drawings. A detailed description to be disclosed along with the accompanying drawings is intended to describe some exemplary embodiments of the present invention and is not intended to describe a sole embodiment of the present invention. The following detailed description includes more details in order to provide full understanding of the present invention. However, those skilled in the art will understand that the present invention may be implemented without such more details.

In some cases, in order to avoid making the concept of the present invention vague, known structures and devices are omitted or may be shown in a block diagram form based on the core functions of each structure and device.

In this specification, a base station has the meaning of a terminal node of a network over which the base station directly communicates with a device. In this document, a specific operation that is described to be performed by a base station may be performed by an upper node of the base station according to circumstances. That is, it is evident that in a network including a plurality of network nodes including a base station, various operations performed for communication with a device may be performed by the base station or other network nodes other than the base station. The base station (BS) may be substituted with another term, such as a fixed station, a Node B, an eNB (evolved-NodeB), a base transceiver system (BTS), or an access point (AP). Furthermore, the device may be fixed or may have mobility and may be substituted with another term, such as user equipment (UE), a mobile station (MS), a user terminal (UT), a mobile subscriber station (MSS), a subscriber station (SS), an advanced mobile station (AMS), a wireless terminal (WT), a machine-type communication (MTC) device, a machine-to-Machine (M2M) device, or a device-to-device (D2D) device.

Hereinafter, downlink (DL) means communication from an eNB to UE, and uplink (UL) means communication from UE to an eNB. In DL, a transmitter may be part of an eNB, and a receiver may be part of UE. In UL, a transmitter may be part of UE, and a receiver may be part of an eNB.

Specific terms used in the following description have been provided to help understanding of the present invention, and the use of such specific terms may be changed in various forms without departing from the technical sprit of the present invention.

The following technologies may be used in a variety of wireless communication systems, such as code division multiple access (CDMA), frequency division multiple access (FDMA), time division multiple access (TDMA), orthogonal frequency division multiple access (OFDMA), single carrier frequency division multiple access (SC-FDMA), and non-orthogonal multiple access (NOMA). CDMA may be implemented using a radio technology, such as universal terrestrial radio access (UTRA) or CDMA2000. TDMA may be implemented using a radio technology, such as global system for mobile communications (GSM)/general packet radio service (GPRS)/enhanced data rates for GSM evolution (EDGE). OFDMA may be implemented using a radio technology, such as Institute of electrical and electronics engineers (IEEE) 802.11 (Wi-Fi), IEEE 802.16 (WiMAX), IEEE 802.20, or evolved UTRA (E-UTRA). UTRA is part of a universal mobile telecommunications system (UMTS). 3rd generation partnership project (3GPP) Long term evolution (LTE) is part of an evolved UMTS (E-UMTS) using evolved UMTS terrestrial radio access (E-UTRA), and it adopts OFDMA in downlink and adopts SC-FDMA in uplink. LTE-advanced (LTE-A) is the evolution of 3GPP LTE.

Embodiments of the present invention may be supported by the standard documents disclosed in at least one of IEEE 802, 3GPP, and 3GPP2, that is, radio access systems. That is, steps or portions that belong to the embodiments of the present invention and that are not described in order to clearly expose the technical spirit of the present invention may be supported by the documents. Furthermore, all terms disclosed in this document may be described by the standard documents.

In order to more clarify a description, 3GPP LTE/LTE-A is chiefly described, but the technical characteristics of the present invention are not limited thereto.

General System to which an Embodiment of the Present Invention May be Applied

FIG. 1 shows the structure of a radio frame in a wireless communication system to which an embodiment of the present invention may be applied.

3GPP LTE/LTE-A support a radio frame structure type 1 which may be applicable to frequency division duplex (FDD) and a radio frame structure which may be applicable to time division duplex (TDD).

In FIG. 1, the size of the radio frame in a time domain is represented as a multiple of a time unit of $T\_s=1/(15000*2048)$. Downlink and uplink transmission includes a radio frame having a period of $T\_f=307200*T\_s=10$ ms.

FIG. 1(a) illustrates the structure of a type 1 radio frame. The type 1 radio frame may be applied to both full duplex and half duplex FDD.

The radio frame includes 10 subframes. One radio frame includes 20 slots of $T\_slot=15360*T\_s=0.5$ ms in length. 0 to 19 indices are assigned to the respective slots. One subframe includes consecutive 2 slots in the time domain, and a subframe i includes a slot 2i and a slot 2i+1. The time taken to send one subframe is called a transmission time period (TTI). For example, the length of one subframe may be 1 ms, and the length of one slot may be 0.5 ms.

In FDD, uplink transmission and downlink transmission are divided in a frequency domain. There is no limit to full duplex FDD, whereas UE cannot send and receive data at the same time in a half duplex FDD operation.

One slot includes a plurality of orthogonal frequency division multiplexing (OFDM) symbols in the time domain and includes a plurality of resource blocks (RBs) in a frequency domain. In 3GPP LTE, OFDM symbols are used to represent one symbol period because OFDMA is used in downlink. An OFDM symbol may be called one SC-FDMA symbol or symbol period. An RB is a resource allocation unit and includes a plurality of consecutive subcarriers in one slot.

FIG. 1(b) shows a frame structure type 2.

The frame structure type 2 includes two half frames, each having a length of $153600*T\_s=5$ ms. Each half frame includes 5 subframes, each having a length of $30720*T\_s=1$ ms.

In the frame structure type 2 of a TDD system, an uplink-downlink configuration is a rule indicating whether uplink and downlink are allocated (or reserved) to all subframes.

Table 1 shows the uplink-downlink configuration.

TABLE 1

| Uplink-Downlink configuration | Downlink-to-Uplink Switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

Referring to Table 1, in each subframe of the radio frame, "D" indicates a subframe for downlink transmission, "U" indicates a subframe for uplink transmission, and "S" indicates a special subframe including three types of fields, including a downlink pilot time slot (DwPTS), a guard period (GP), and an uplink pilot time slot (UpPTS).

The DwPTS is used for initial cell search, synchronization or channel estimation in UE. The UpPTS is used for synchronization of uplink transmission for UE and channel estimation in an eNB. The GP is a period for removing interference generated in uplink due to multi-path delay of a downlink signal between uplink and downlink.

Each subframe i includes a slot 2i and a slot 2i+1, each having T_slot=15360*T_s=0.5 ms length.

An uplink-downlink configuration may be classified into 7 types. The positions and/or number of downlink subframes, special subframes, and uplink subframe are different in each configuration.

A point of time at which a change is performed from downlink to uplink or a point of time at which a change is performed from uplink to downlink is called a switching point. The periodicity of the switching point means a cycle in which an uplink subframe and a downlink subframe are changed is identically repeated. Both 5 ms and 10 ms are supported in the periodicity of a switching point. If the periodicity of a switching point has a cycle of a 5 ms downlink-uplink switching point, the special subframe S is present in each half frame. If the periodicity of a switching point has a cycle of a 5 ms downlink-uplink switching point, the special subframe S is present in the first half frame only.

In all the configurations, 0 and 5 subframes and a DwPTS are used for only downlink transmission. An UpPTS and a subframe subsequent to a subframe are always used for uplink transmission.

Such uplink-downlink configurations may be known to both an eNB and UE as system information. An eNB may notify UE of a change of the uplink-downlink allocation state of a radio frame by transmitting only the index of uplink-downlink configuration information to the UE whenever the uplink-downlink configuration information is changed. Furthermore, configuration information is kind of downlink control information and may be transmitted through a physical downlink control channel (PDCCH) like other scheduling information. Configuration information may be transmitted to all pieces of UE within a cell through a broadcast channel as broadcasting information.

Table 2 shows the configuration (the length of a DwPTS/GP/UpPTS) of a special subframe.

FIG. 2 is a diagram illustrating a resource grid for one downlink slot in a wireless communication system to which an embodiment of the present invention may be applied.

Referring to FIG. 2, one downlink slot includes a plurality of OFDM symbols in a time domain. It is described herein that one downlink slot includes 7 OFDMA symbols and one resource block includes 12 subcarriers for exemplary purposes only, and the present invention is not limited thereto.

Each element on the resource grid is referred to as a resource element, and one resource block (RB) includes 12·7 resource elements. The number of RBs $N^{DL}$ included in a downlink slot depends on a downlink transmission bandwidth.

The structure of an uplink slot may be the same as that of a downlink slot.

FIG. 3 shows the structure of a downlink subframe in a wireless communication system to which an embodiment of the present invention may be applied.

Referring to FIG. 3, a maximum of three OFDM symbols located in a front portion of a first slot of a subframe correspond to a control region in which control channels are allocated, and the remaining OFDM symbols correspond to a data region in which a physical downlink shared channel (PDSCH) is allocated. Downlink control channels used in 3GPP LTE include, for example, a physical control format indicator channel (PCFICH), a physical downlink control channel (PDCCH), and a physical hybrid-ARQ indicator channel (PHICH).

A PCFICH is transmitted in the first OFDM symbol of a subframe and carries information about the number of OFDM symbols (i.e., the size of a control region) which is used to transmit control channels within the subframe. A PHICH is a response channel for uplink and carries an acknowledgement (ACK)/not-acknowledgement (NACK) signal for a Hybrid Automatic Repeat Request (HARQ). Control information transmitted in a PDCCH is called Downlink Control Information (DCI). DCI includes uplink resource allocation information, downlink resource allocation information, or an uplink transmission (Tx) power control command for a specific UE group.

A PDCCH may carry information about the resource allocation and transport format of a downlink shared channel (DL-SCH) (this is also called an "downlink grant"), resource allocation information about an uplink shared channel (UL-

TABLE 2

| Special subframe configuration | Normal cyclic prefix in downlink | | | Extended cyclic prefix in downlink | | |
|---|---|---|---|---|---|---|
| | | UpPTS | | | UpPTS | |
| | DwPTS | Normal cyclic prefix in uplink | Extended cyclic prefix in uplink | DwPTS | Normal cyclic prefix in uplink | Extended cyclic prefix in uplink |
| 0 | 6592 · $T_s$ | 2192 · $T_s$ | 2560 · $T_s$ | 7680 · $T_s$ | 2192 · $T_s$ | 2560 · $T_s$ |
| 1 | 19760 · $T_s$ | | | 20480 · $T_s$ | | |
| 2 | 21952 · $T_s$ | | | 23040 · $T_s$ | | |
| 3 | 24144 · $T_s$ | | | 25600 · $T_s$ | | |
| 4 | 26336 · $T_s$ | | | 7680 · $T_s$ | 4384 · $T_s$ | 5120 · $T_s$ |
| 5 | 6592 · $T_s$ | 4384 · $T_s$ | 5120 · $T_s$ | 20480 · $T_s$ | | |
| 6 | 19760 · $T_s$ | | | 23040 · $T_s$ | | |
| 7 | 21952 · $T_s$ | | | — | — | — |
| 8 | 24144 · $T_s$ | | | — | — | — |

The structure of the radio frame according to the example of FIG. 1 is only an example. The number of subcarriers included in a radio frame or the number of slots included in a subframe and the number of OFDM symbols included in a slot may be changed in various ways.

SCH) (this is also called a "uplink grant"), paging information on a PCH, system information on a DL-SCH, the resource allocation of a higher layer control message, such as a random access response transmitted on a PDSCH, a set of transmission power control commands for individual UE within specific UE group, and the activation of a Voice over Internet Protocol (VoIP), etc. A plurality of PDCCHs may be transmitted within the control region, and UE may monitor a plurality of PDCCHs. A PDCCH is transmitted on a single Control Channel Element (CCE) or an aggregation of some consecutive CCEs. A CCE is a logical allocation unit that is used to provide a PDCCH with a coding rate according to the state of a radio channel. A CCE corresponds to a plurality of resource element groups. The format of a PDCCH and the number of available bits of a PDCCH are determined by an association relationship between the number of CCEs and a coding rate provided by CCEs.

An eNB determines the format of a PDCCH based on DCI to be transmitted to UE and attaches cyclic redundancy check (CRC) to control information. A unique identifier (a radio network temporary identifier (RNTI)) is masked to the CRC depending on the owner or use of a PDCCH. If the PDCCH is a PDCCH for specific UE, an identifier unique to the UE, for example, a cell-RNTI (C-RNTI) may be masked to the CRC. If the PDCCH is a PDCCH for a paging message, a paging indication identifier, for example, a paging-RNTI (P-RNTI) may be masked to the CRC. If the PDCCH is a PDCCH for system information, more specifically, a system information block (SIB), a system information identifier, for example, a system information-RNTI (SI-RNTI) may be masked to the CRC. A random access-RNTI (RA-RNTI) may be masked to the CRC in order to indicate a random access response which is a response to the transmission of a random access preamble by UE.

FIG. 4 shows the structure of an uplink subframe in a wireless communication system to which an embodiment of the present invention may be applied.

Referring to FIG. 4, the uplink subframe may be divided into a control region and a data region in a frequency domain. A physical uplink control channel (PUCCH) carrying uplink control information is allocated to the control region. A physical uplink shared channel (PUSCH) carrying user data is allocated to the data region. In order to maintain single carrier characteristic, one UE does not send a PUCCH and a PUSCH at the same time.

A resource block (RB) pair is allocated to a PUCCH for one UE within a subframe. RBs belonging to an RB pair occupy different subcarriers in each of 2 slots. This is called that an RB pair allocated to a PUCCH is frequency-hopped in a slot boundary.

Multi-Input Multi-Output (MIMO)

A MIMO technology does not use single transmission antenna and single reception antenna that have been commonly used so far, but uses a multi-transmission (Tx) antenna and a multi-reception (Rx) antenna. In other words, the MIMO technology is a technology for increasing a capacity or enhancing performance using multi-input/output antennas in the transmission end or reception end of a wireless communication system. Hereinafter, MIMO is called a "multi-input/output antenna."

More specifically, the multi-input/output antenna technology does not depend on a single antenna path in order to receive a single total message and completes total data by collecting a plurality of data pieces received through several antennas. As a result, the multi-input/output antenna technology can increase a data transfer rate within a specific system range and can also increase a system range through a specific data transfer rate.

It is expected that an efficient multi-input/output antenna technology will be used because next-generation mobile communication requires a data transfer rate much higher than that of existing mobile communication. In such a situation, the MIMO communication technology is a next-generation mobile communication technology which may be widely used in mobile communication UE and a relay node and has been in the spotlight as a technology which may overcome a limit to the transfer rate of another mobile communication attributable to the expansion of data communication.

The multi-input/output antenna (MIMO) technology of various transmission efficiency improvement technologies that are being developed has been most in the spotlight as a method capable of significantly improving a communication capacity and transmission/reception performance even without the allocation of additional frequencies or a power increase.

FIG. 5 shows the configuration of a known MIMO communication system.

Referring to FIG. 5, if the number of transmission (Tx) antennas is increased to N_T and the number of reception (Rx) antennas is increased to N_R at the same time, a theoretical channel transmission capacity is increased in proportion to the number of antennas, unlike in the case where a plurality of antennas is used only in a transmitter or a receiver. Accordingly, a transfer rate can be improved, and frequency efficiency can be significantly improved. In this case, a transfer rate according to an increase of a channel transmission capacity may be theoretically increased by a value obtained by multiplying the following rate increment R_i by a maximum transfer rate R_o if one antenna is used.

$$R_i = \min(N_T, N_R) \quad \text{[Equation 1]}$$

That is, in an MIMO communication system using 4 transmission antennas and 4 reception antennas, for example, a quadruple transfer rate can be obtained theoretically compared to a single antenna system.

Such a multi-input/output antenna technology may be divided into a spatial diversity method for increasing transmission reliability using symbols passing through various channel paths and a spatial multiplexing method for improving a transfer rate by sending a plurality of data symbols at the same time using a plurality of transmission antennas. Furthermore, active research is being recently carried out on a method for properly obtaining the advantages of the two methods by combining the two methods.

Each of the methods is described in more detail below.

First, the spatial diversity method includes a space-time block code-series method and a space-time Trelis code-series method using a diversity gain and a coding gain at the same time. In general, the Trelis code-series method is better in terms of bit error rate improvement performance and the degree of a code generation freedom, whereas the space-time block code-series method has low operational complexity. Such a spatial diversity gain may correspond to an amount corresponding to the product (N_T×N_R) of the number of transmission antennas (N_T) and the number of reception antennas (N_R).

Second, the spatial multiplexing scheme is a method for sending different data streams in transmission antennas. In this case, in a receiver, mutual interference is generated between data transmitted by a transmitter at the same time. The receiver removes the interference using a proper signal processing scheme and receives the data. A noise removal method used in this case, may include a maximum likelihood detection (MLD) receiver, a zero-forcing (ZF) receiver, a minimum mean square error (MMSE) receiver, diagonal-bell laboratories layered space-time (D-BLAST), and vertical-bell laboratories layered space-time (V-BLAST). In particular, if a transmission end can be aware of channel information, a singular value decomposition (SVD) method may be used.

Third, there is a method using a combination of a spatial diversity and spatial multiplexing. If only a spatial diversity gain is to be obtained, a performance improvement gain according to an increase of a diversity disparity is gradually saturated. If only a spatial multiplexing gain is used, transmission reliability in a radio channel is deteriorated. Methods for solving the problems and obtaining the two gains have been researched and may include a double space-time transmit diversity (double-STTD) method and a space-time bit interleaved coded modulation (STBICM).

In order to describe a communication method in a multi-input/output antenna system, such as that described above, in more detail, the communication method may be represented as follows through mathematical modeling.

First, as shown in FIG. 5, it is assumed that N_T transmission antennas and N_R reception antennas are present.

First, a transmission signal is described below. If the N_T transmission antennas are present as described above, a maximum number of pieces of information which can be transmitted are N_T, which may be represented using the following vector.

$$s = [s_1, s_2, \ldots, s_{N_T}]^T \qquad \text{[Equation 2]}$$

Transmission power may be different in each of pieces of transmission information s_1, s_2, . . . , s_NT. In this case, if pieces of transmission power are P_1, P_2, . . . , P_NT, transmission information having controlled transmission power may be represented using the following vector.

$$\hat{s} = [\hat{s}_1, \hat{s}_2, \ldots, \hat{s}_{N_T}]^T = [P_1 s_1, P_2 s_2, \ldots, P_{N_T} s_{N_T}]^T \qquad \text{[Equation 3]}$$

In Equation 3, transmission information having controlled transmission power may be represented as follows using the diagonal matrix P of transmission power.

$$\hat{s} = \begin{bmatrix} P_1 & & & 0 \\ & P_2 & & \\ & & \ddots & \\ 0 & & & P_{N_T} \end{bmatrix} \begin{bmatrix} s_1 \\ s_2 \\ \vdots \\ s_{N_T} \end{bmatrix} = Ps \qquad \text{[Equation 4]}$$

The information vector having controlled transmission power in Equation 4 is multiplied by a weight matrix W, thus forming N_T transmission signals x_1, x_2, . . . , x_NT that are actually transmitted. In this case, the weight matrix functions to properly distribute the transmission information to antennas according to a transport channel condition. The following may be represented using the transmission signals x_1, x_2, . . . , x_NT.

$$x = \begin{bmatrix} x_1 \\ x_2 \\ \vdots \\ x_i \\ \vdots \\ x_{N_T} \end{bmatrix} = \begin{bmatrix} w_{11} & w_{12} & \ldots & w_{1N_T} \\ w_{21} & w_{22} & \ldots & w_{2N_T} \\ \vdots & & \ddots & \\ w_{i1} & w_{i2} & \ldots & w_{iN_T} \\ \vdots & & \ddots & \\ w_{N_T 1} & w_{N_T 2} & \ldots & w_{N_T N_T} \end{bmatrix} \begin{bmatrix} \hat{s}_1 \\ \hat{s}_2 \\ \vdots \\ \hat{s}_j \\ \vdots \\ \hat{s}_{N_T} \end{bmatrix} = W\hat{s} = WPs \qquad \text{[Equation 5]}$$

In Equation 5, w_ij denotes weight between an i-th transmission antenna and a j-th transmission information, and W is an expression of a matrix of the weight. Such a matrix W is called a weight matrix or precoding matrix.

The transmission signal x, such as that described above, may be taken into consideration to be used in the case where a spatial diversity is used and a case where spatial multiplexing is used.

If spatial multiplexing is used, all the elements of the information vector s have different values because different signals are multiplexed and transmitted. In contrast, if the spatial diversity is used, all the elements of the information vector s have the same value because the same signals are transmitted through several channel paths.

A method of mixing spatial multiplexing and the spatial diversity may be taken into consideration. In other words, the same signals may be transmitted using the spatial diversity through 3 transmission antennas, for example, and the remaining different signals may be spatially multiplexed and transmitted.

If N_R reception antennas are present, the reception signals y_1, y_2, . . . , y_NR of the respective antennas are represented as follows using a vector y.

$$y = [y_1, y_2, \ldots, y_{N_R}]^T \qquad \text{[Equation 6]}$$

Meanwhile, if channels in a multi-input/output antenna communication system are modeled, the channels may be classified according to transmission/reception antenna indices. A channel passing through a reception antenna i from a transmission antenna j is represented as h_ij. In this case, it is to be noted that in order of the index of h_ij, the index of a reception antenna comes first and the index of a transmission antenna then comes.

Several channels may be grouped and expressed in a vector and matrix form. For example, a vector expression is described below.

FIG. 6 is a diagram showing a channel from a plurality of transmission antennas to a single reception antenna.

As shown in FIG. 6, a channel from a total of N_T transmission antennas to a reception antenna i may be represented as follows.

$$h_i^T = [h_{i1}, h_{i2}, \ldots, h_{iN_T}] \qquad \text{[Equation 7]}$$

Furthermore, if all channels from the N_T transmission antenna to N_R reception antennas are represented through a matrix expression, such as Equation 7, they may be represented as follows.

$$H = \begin{bmatrix} h_1^T \\ h_2^T \\ \vdots \\ h_i^T \\ \vdots \\ h_{N_R}^T \end{bmatrix} = \begin{bmatrix} h_{11} & h_{12} & \ldots & h_{1N_T} \\ h_{21} & h_{22} & \ldots & h_{2N_T} \\ \vdots & & \ddots & \\ h_{i1} & h_{i2} & \ldots & h_{iN_T} \\ \vdots & & \ddots & \\ h_{N_R 1} & h_{N_R 2} & \ldots & h_{N_R N_T} \end{bmatrix} \qquad \text{[Equation 8]}$$

Additive white Gaussian noise (AWGN) is added to an actual channel after the actual channel experiences the channel matrix H. Accordingly, AWGN n_1, n_2, . . . , n_N_R added to the N_R reception antennas, respectively, are represented using a vector as follows.

$$n = [n_1, n_2, \ldots, n_{N_R}]^T \qquad \text{[Equation 9]}$$

A transmission signal, a reception signal, a channel, and AWGN in a multi-input/output antenna communication system may be represented to have the following relationship through the modeling of the transmission signal, reception signal, channel, and AWGN, such as those described above.

$$y = \begin{bmatrix} y_1 \\ y_2 \\ \vdots \\ y_i \\ \vdots \\ y_{N_R} \end{bmatrix} = \begin{bmatrix} h_{11} & h_{12} & \cdots & h_{1N_T} \\ h_{21} & h_{22} & \cdots & h_{2N_T} \\ \vdots & & \ddots & \vdots \\ h_{i1} & h_{i2} & \cdots & h_{iN_T} \\ \vdots & & \ddots & \vdots \\ h_{N_R 1} & h_{N_R 2} & \cdots & h_{N_R N_T} \end{bmatrix} \begin{bmatrix} x_1 \\ x_2 \\ \vdots \\ x_j \\ \vdots \\ x_{N_T} \end{bmatrix} + \begin{bmatrix} n_1 \\ n_2 \\ \vdots \\ n_i \\ \vdots \\ n_{N_R} \end{bmatrix} = \quad \text{[Equation 10]}$$

$$Hx + n$$

The number of rows and columns of the channel matrix H indicative of the state of channels is determined by the number of transmission/reception antennas. In the channel matrix H, as described above, the number of rows becomes equal to the number of reception antennas N_R, and the number of columns becomes equal to the number of transmission antennas N_T. That is, the channel matrix H becomes an N_R×N_T matrix.

In general, the rank of a matrix is defined as a minimum number of the number of independent rows or columns. Accordingly, the rank of the matrix is not greater than the number of rows or columns. As for figural style, for example, the rank H of the channel matrix H is limited as follows.

$$\text{rank}(H) \leq \min(N_T, N_R) \quad \text{[Equation 11]}$$

Furthermore, if a matrix is subjected to Eigen value decomposition, a rank may be defined as the number of Eigen values that belong to Eigen values and that are not 0. Likewise, if a rank is subjected to singular value decomposition (SVD), it may be defined as the number of singular values other than 0. Accordingly, the physical meaning of a rank in a channel matrix may be said to be a maximum number on which different information may be transmitted in a given channel.

In this specification, a "rank" for MIMO transmission indicates the number of paths through which signals may be independently transmitted at a specific point of time and a specific frequency resource. The "number of layers" indicates the number of signal streams transmitted through each path. In general, a rank has the same meaning as the number of layers unless otherwise described because a transmission end sends the number of layers corresponding to the number of ranks used in signal transmission.

Reference Signal (RS)

In a wireless communication system, since data is transmitted through a radio channel, a signal may be distorted during transmission. In order for the receiving end to accurately receive the distorted signal, the distortion of the received signal needs to be corrected using channel information. In order to detect the channel information, a signal transmitting method known to both the transmitter side and the receiver side and a method for detecting the channel information using the degree of distortion when the signal is transmitted through the channel are primarily used. The aforementioned signal is referred to as a pilot signal or a reference signal (RS).

Recently, when packets are transmitted in most mobile communication systems, multiple transmission antennas and multiple reception antennas are adopted to increase data transmission/reception efficiency, unlike the related art using a single transmission antenna and a single reception antenna. In transmission and reception of data using multiple input/output antennas, the channel states between transmission antennas and reception antennas should be detected in order to accurately receive signals. Accordingly, each transmission antenna needs to have an individual reference signal.

In a wireless communication system, RSs can be largely classified into two types according to its purpose. The RSs include an RS for channel information acquisition and RSs for data demodulation. The former is used for acquisition of channel information to downlink by a UE. Thus, the former RS needs to be transmitted in a wideband, and even a UE that does not receive downlink data in a specific subframe needs to receive and measure the RS. In addition, this RS is also used for measurement for mobility management (RRM) such as handover. The latter is an RS that is transmitted together with corresponding resource when a base station transmits downlink data. In this regard, the UE can receive the corresponding RS to estimate the channel and accordingly demodulate data. This RS needs to be transmitted in a region in which data is transmitted.

Downlink reference signals include a common RS (CRS) for acquiring information on channel states shared by all terminals within a cell and measuring handover, etc. and a dedicated RS used for data modulation for a specific terminal. Using these reference signals, information for demodulation and channel measurement may be provided. That is, the DRS is used only for data demodulation, while the CRS is used for two purposes including channel information acquisition and data demodulation.

The receiver side (that is, terminal) measures the channel state from the CRS and feeds back the indicators associated with the channel quality, such as the channel quality indicator (CQI), the precoding matrix index (PMI), and/or the rank indicator (RI) to the transmitting side (that is, base station). The CRS is also referred to as a cell-specific RS. On the contrary, a reference signal associated with a feed-back of channel state information (CSI) may be defined as CSI-RS.

The DRS may be transmitted through resource elements when data demodulation on the PDSCH is required. The terminal may receive whether the DRS is present through the upper layer and is valid only when the corresponding PDSCH is mapped. The DRS may be referred to as a UE-specific RS or a demodulation RS (DMRS).

FIG. 7 illustrates a reference signal pattern mapped to a downlink resource block pair in the wireless communication system to which an embodiment of the present invention may be applied.

Referring to FIG. 7, as a unit by which a reference signal is mapped, a downlink resource block pair may be represented by one subframe in the time domain×12 subcarriers in the frequency domain. In other words, one resource block pair on the time axis (x-axis) has a length of 14 OFDM symbols in the case of a normal CP (Cyclic Prefix) (in the case of FIG. 7(a)) and has a length of 12 OFDM symbols in the case of an extended CP (in the case of FIG. 7(b)). In the resource block grids, the resource elements (REs) denoted by '0', '1', '2', and '3' indicate the CRS positions of antennas with indices of '0', '1', '2', and '3', respectively; and the resource elements denoted by 'D' indicate DRS positions.

In what follows, a more detailed description of a CRS will be provided. A CRS is used for estimating a channel of a physical antenna and is distributed across the whole frequency band as a reference signal that may be received commonly by all of the UEs located within a cell. In other words, the CRS is a cell-specific signal and is transmitted for each subframe in the broadband. Also, the CRS may be used for obtaining channel state information (CSI) and data demodulation.

A CRS is defined in various formats according to the antenna arrangement at the transmitter side (base station). In a 3GPP LTE system (for example, release-8), an RS for up to four antenna ports is transmitted depending on the number of transmission antennas of the base station. The downlink signal transmitter has three types of antenna arrangement: a single transmission antenna, two transmission antennas, and four transmission antennas. For example, if the base station uses two transmission antennas, a CRS for the antennas ports 0 and 1 is transmitted, and if the base station uses four transmission antennas, a CRS for the antenna ports 0 to 3 is transmitted. A CRS pattern in one RB when the base station uses four transmission antennas is as shown in FIG. 7.

If the base station uses a single transmission antenna, a reference signal for the single antenna port is arrayed.

When the base station uses two transmission antennas, reference signals for two transmitting antenna ports are arrayed by using a time division multiplexing (TDM) scheme and/or a frequency division multiplexing (FDM) scheme. That is, different time resources and/or different frequency resources are allocated to the reference signals for two antenna ports so as to be distinguished from each other.

Moreover, when the base station uses four transmission antennas, reference signals for four transmitting antenna ports are arrayed using the TDM and/or FDM scheme. Channel information measured by a downlink signal receiving side (i.e., a terminal) may be used to demodulate data transmitted by using a transmission scheme such as single transmitting antenna transmission, transmission diversity, closed-loop spatial multiplexing, open-loop spatial multiplexing, or multi-user MIMO.

In the case where the multi-input/multi-output antenna is supported, when the reference signal is transmitted from a specific antenna port, the reference signal is transmitted to the positions of specific resource elements according to a pattern of the reference signal and not transmitted to the positions of the specific resource elements for another antenna port. That is, reference signals among different antennas are not duplicated with each other.

In what follows, a more detailed description of a DRS will be provided. A DRS is used for demodulating data. The precoding weight used for a specific UE in MIMO antenna transmission is combined with a transmission channel transmitted from each transmission antenna when the UE receives a reference signal. The combined precoding weight is then used without being modified for estimating the corresponding channel.

The 3GPP LTE system (for example, release-8) supports up to four transmission antennas and defines a DRS for rank 1 beamforming. The DRS for rank 1 beamforming also represents a reference signal for an antenna port index 5.

The LTE-A system, which has evolved from the LTE system, has to be designed to support up to 8 transmission antennas for downlink transmission of the base station. Therefore, an RS for up to 8 transmission antennas also has to be supported. The LTE system only defines a downlink RS for up to four antenna ports. Therefore, if the base station in the LTE-A system uses 4 up to 8 downlink transmission antennas, an RS for these antenna ports has to be additionally defined and designed. The RS for up to 8 transmission antennas has to be designed for both an RS for channel measurement and an RS for data demodulation as described above.

One of important factors to be considered in designing the LTE-A system is backward compatibility; namely, an LTE terminal is required to operate smoothly in the LTE-A system, and the system has to also support the operation. In view of RS transmission, an RS has to be defined additionally for up to 8 transmission antenna ports in the time-frequency region in which a CRS defined in the LTE system is transmitted over the whole frequency band at each subframe. If an RS pattern for up to 8 transmission antennas is added in the LTE-A system over the whole frequency band for each subframe in the same way as the CRS of the existing LTE system, the RS overhead becomes too large.

Therefore, RSs newly designed in the LTE-A system may be classified largely into two types: an RS for channel measurement to select MCS, PMI, etc. (CSI-RS: Channel State Information-RS, Channel State Indication-RS, etc.) and an RS for demodulation of data transmitted by 8 transmission antennas (DM-RS: Data Demodulation-RS).

The CSI-RS for channel measurement is designed for the purpose of channel measurement, which is different from the conventional CRS that is used for both measurement, such as channel measurement and handover measurement, and data demodulation. This CSI-RS may also be used for handover measurement, etc. Since the CSI-RS is transmitted only for obtaining channel state information, the CSI-RS does not have to be transmitted for each subframe, as opposed to the conventional CRS. To reduce the overhead of the CSI-RS, the CSI-RS is transmitted intermittently on the time axis.

For data demodulation, a dedicated DM-RS is transmitted to the UE scheduled in the corresponding time-frequency region. In other words, the DM-RS of a specific UE is transmitted only the region in which the corresponding UE is scheduled, that is, in the time-frequency region in which the corresponding UE receives data.

An LTE-A system supports up to 8 transmission antennas for downlink transmission of the base station. If an RS for up to 8 transmission antennas is transmitted over the whole frequency band for each subframe in the same way as the CRS of the existing LTE system, the RS overhead becomes too large. Therefore, two types of RSs are added to the LTE-A system: a CSI-RS for CSI measurement to select MCS, PMI, etc. and a DM-RS for data modulation. The CSI-RS is designed mainly for CSI acquisition, although it may be used for RRM measurement as well. Since the CSI-RS is not used for data demodulation, the CSI-RS does not have to be transmitted for each subframe. To reduce the overhead of the CSI-RS, the CSI-RS is transmitted intermittently on the time axis. In other words, the CSI-RS may be transmitted repeatedly with a period of an integer multiple of one subframe or transmitted with a specific transmission pattern. At this time, the eNB may determine the period or pattern by which the CSI-RS is transmitted.

For data demodulation, a dedicated DM-RS is transmitted to the UE scheduled in the corresponding time-frequency region. In other words, the DM-RS of a specific UE is transmitted only the region in which the corresponding UE is scheduled, that is, the time-frequency region in which the corresponding UE receives data.

To measure a CSI-RS, the UE has to be aware of the information about a transmission subframe index of the CSI-RS for each CSI-RS antenna port of a cell to which the UE belongs, the time-frequency position of a CSI-RS resource element (RE) within the transmission subframe, and a CSI-RS sequence.

The eNB in the LTE-A system has to transmit a CSI-RS to each of up to eight antenna ports. Resources used for CSI-RS transmission of different antenna ports have to be orthogonal to each other. When one eNB transmits CSI-RSs for different antenna ports, the eNB may allocate the resources orthogonally according to the FDM/TDM scheme by mapping the CSI-RS for each antenna port to a different RE. Similarly, the CSI-RSs for different antenna ports may be transmitted according to the CDM scheme in which the CSI-RSs are mapped to orthogonal codes.

When an eNB notifies information of a CSI-RS to a UE in its own cell, the information of the time-frequency in which the CSI-RS for each antenna port is mapped should be notified. Particularly, the information includes the subframe numbers on which the CSI-RS is transmitted, the period of the CSI-RS being transmitted, the subframe offset in which the CSI-RS is transmitted, the OFDM symbol number in which the CSI-RS RE of a specific antenna is transmitted, the frequency spacing, the offset or shift value of RE on the frequency axis.

The CSI-RS is transmitted through 1, 2, 4 or 8 antenna ports. In this case, the antenna port which is used is p=15, p=15, 16, p=15, . . . , 18, or p=15, . . . , 22. The CSI-RS may be defined only for the subcarrier interval Δf=15 kHz.

In the subframe configured to transmit the CSI-RS, the CSI-RS sequence is mapped to the complex-valued modulation symbol a_k, l˜(p) that is used as a reference symbol on each antenna port (p) as represented by Equation 12 below.

$$a^{(p)}_{k,l} = w_{l''} \cdot r_{l,n_s}(m') \qquad [\text{Equation 12}]$$

$$k = k' + 12m + \begin{cases} -0 & \text{for } p \in \{15, 16\}, \text{ normal cyclic prefix} \\ -6 & \text{for } p \in \{17, 18\}, \text{ normal cyclic prefix} \\ -1 & \text{for } p \in \{19, 20\}, \text{ normal cyclic prefix} \\ -7 & \text{for } p \in \{21, 22\}, \text{ normal cyclic prefix} \\ -0 & \text{for } p \in \{15, 16\}, \text{ extended cyclic prefix} \\ -3 & \text{for } p \in \{17, 18\}, \text{ extended cyclic prefix} \\ -6 & \text{for } p \in \{19, 20\}, \text{ extended cyclic prefix} \\ -9 & \text{for } p \in \{21, 22\}, \text{ extended cyclic prefix} \end{cases}$$

$$l = l' + \begin{cases} l'' & \text{CSI reference signal configurations 0-19, normal cyclic prefix} \\ 2l'' & \text{CSI reference signal configurations 20-31, normal cyclic prefix} \\ l'' & \text{CSI reference signal configurations 0-27, extended cyclic prefix} \end{cases}$$

$$w_{l'} = \begin{cases} 1 & p \in \{15, 17, 19, 21\} \\ (-1)^{l''} & p \in \{16, 18, 20, 22\} \end{cases}$$

$$l'' = 0, 1$$

$$m = 0, 1, \ldots, N_{RB}^{DL} - 1$$

$$m' = m + \left\lfloor \frac{N_{RB}^{max,DL} - N_{RB}^{DL}}{2} \right\rfloor$$

In Equation 12 above, (k', l') (herein, k' is a subcarrier index in a resource block, and l' represents an OFDM symbol index in a slot) and the condition of n_s is determined according to the CSI-RS configuration shown in Table 3 or Table 4 below.

Table 3 exemplifies the mapping of (k', l') according to the CSI-RS configuration for the normal CP.

TABLE 3

| | CSI reference signal configuration | Number of CSI reference signals configured | | | | | |
|---|---|---|---|---|---|---|---|
| | | 1 or 2 | | 4 | | 8 | |
| | | (k', l') | $n_s$ mod 2 | (k', l') | $n_s$ mod 2 | (k', l') | $n_s$ mod 2 |
| Frame structure type 1 and 2 | 0 | (9, 5) | 0 | (9, 5) | 0 | (9, 5) | 0 |
| | 1 | (11, 2) | 1 | (11, 2) | 1 | (11, 2) | 1 |
| | 2 | (9, 2) | 1 | (9, 2) | 1 | (9, 2) | 1 |
| | 3 | (7, 2) | 1 | (7, 2) | 1 | (7, 2) | 1 |
| | 4 | (9, 5) | 1 | (9, 5) | 1 | (9, 5) | 1 |
| | 5 | (8, 5) | 0 | (8, 5) | 0 | | |
| | 6 | (10, 2) | 1 | (10, 2) | 1 | | |
| | 7 | (8, 2) | 1 | (8, 2) | 1 | | |
| | 8 | (6, 2) | 1 | (6, 2) | 1 | | |
| | 9 | (8, 5) | 1 | (8, 5) | 1 | | |
| | 10 | (3, 5) | 0 | | | | |
| | 11 | (2, 5) | 0 | | | | |
| | 12 | (5, 2) | 1 | | | | |
| | 13 | (4, 2) | 1 | | | | |
| | 14 | (3, 2) | 1 | | | | |
| | 15 | (2, 2) | 1 | | | | |
| | 16 | (1, 2) | 1 | | | | |
| | 17 | (0, 2) | 1 | | | | |
| | 18 | (3, 5) | 1 | | | | |
| | 19 | (2, 5) | 1 | | | | |
| Frame structure type 2 only | 20 | (11, 1) | 1 | (11, 1) | 1 | (11, 1) | 1 |
| | 21 | (9, 1) | 1 | (9, 1) | 1 | (9, 1) | 1 |
| | 22 | (7, 1) | 1 | (7, 1) | 1 | (7, 1) | 1 |
| | 23 | (10, 1) | 1 | (10, 1) | 1 | | |
| | 24 | (8, 1) | 1 | (8, 1) | 1 | | |
| | 25 | (6, 1) | 1 | (6, 1) | 1 | | |
| | 26 | (5, 1) | 1 | | | | |
| | 27 | (4, 1) | 1 | | | | |
| | 28 | (3, 1) | 1 | | | | |
| | 29 | (2, 1) | 1 | | | | |
| | 30 | (1, 1) | 1 | | | | |
| | 31 | (0, 1) | 1 | | | | |

Table 4 exemplifies the mapping of (k', l') according to the CSI-RS configuration for the extended CP.

TABLE 4

| | CSI reference signal configuration | Number of CSI reference signals configured | | | | | |
|---|---|---|---|---|---|---|---|
| | | 1 or 2 | | 4 | | 8 | |
| | | (k', l') | $n_s$ mod 2 | (k', l') | $n_s$ mod 2 | (k', l') | $n_s$ mod 2 |
| Frame structure type 1 and 2 | 0 | (11, 4) | 0 | (11, 4) | 0 | (11, 4) | 0 |
| | 1 | (9, 4) | 0 | (9, 4) | 0 | (9, 4) | 0 |
| | 2 | (10, 4) | 1 | (10, 4) | 1 | (10, 4) | 1 |
| | 3 | (9, 4) | 1 | (9, 4) | 1 | (9, 4) | 1 |
| | 4 | (5, 4) | 0 | (5, 4) | 0 | | |
| | 5 | (3, 4) | 0 | (3, 4) | 0 | | |
| | 6 | (4, 4) | 1 | (4, 4) | 1 | | |
| | 7 | (3, 4) | 1 | (3, 4) | 1 | | |
| | 8 | (0, 4) | 0 | | | | |
| | 9 | (6, 4) | 0 | | | | |
| | 10 | (2, 4) | 0 | | | | |
| | 11 | (0, 4) | 0 | | | | |
| | 12 | (7, 4) | 1 | | | | |
| | 13 | (6, 4) | 1 | | | | |
| | 14 | (1, 4) | 1 | | | | |
| | 15 | (0, 4) | 1 | | | | |

TABLE 4-continued

| | CSI reference signal configuration | Number of CSI reference signals configured | | | | | |
|---|---|---|---|---|---|---|---|
| | | 1 or 2 | | 4 | | 8 | |
| | | (k', l') | $n_s$ mod 2 | (k', l') | $n_s$ mod 2 | (k', l') | $n_s$ mod 2 |
| Frame structure type 2 only | 16 | (11, 1) | 1 | (11, 1) | 1 | (11, 1) | 1 |
| | 17 | (10, 1) | 1 | (10, 1) | 1 | (10, 1) | 1 |
| | 18 | (9, 1) | 1 | (9, 1) | 1 | (9, 1) | 1 |
| | 19 | (5, 1) | 1 | (5, 1) | 1 | | |
| | 20 | (4, 1) | 1 | (4, 1) | 1 | | |
| | 21 | (3, 1) | 1 | (3, 1) | 1 | | |
| | 22 | (8, 1) | 1 | | | | |
| | 23 | (7, 1) | 1 | | | | |
| | 24 | (6, 1) | 1 | | | | |
| | 25 | (2, 1) | 1 | | | | |
| | 26 | (1, 1) | 1 | | | | |
| | 27 | (0, 1) | 1 | | | | |

Referring to Table 3 and Table 4, for the CSI-RS transmission, in order to decrease the inter-cell interference (ICI) in the multi-cell environment including the heterogeneous network (HetNet) environment, different configurations of maximum 32 (in the case of normal CP) or maximum 28 (in the case of extended CP) are defined.

A CSI-RS configuration differs depending on the number of antenna ports in a cell, and neighboring cells are configured as differently as possible. Also, the CSI-RS configuration may be applied to both an FDD frame and a TDD frame or only a TDD frame, depending on the frame structure.

Based on Table 3 and Table 4, (k', l') and n_s are determined according to the CSI-RS configuration, and time-frequency resources used for CSI-RS transmission are determined for each CSI-RS antenna port.

FIG. 8 is a diagram illustrating resources to which reference signals are mapped in a wireless communication system to which the present invention may be applied. Particularly, FIG. 8 illustrates CSI-RS patterns for 1, 2, 4, or 8 CSI-RS antenna ports within a subframe to which normal CP is applied.

(a) of FIG. 8 shows 20 CSI-RS configurations available for CSI-RS transmission by 1 or 2 CSI-RS antenna ports, (b) of FIG. 8 shows 10 CSI-RS configurations available for CSI-RS transmission by 4 CSI-RS antenna ports, and (c) of FIG. 8 shows 5 CSI-RS configurations available for CSI-RS transmission by 8 CSI-RS antenna ports.

In this way, radio resources (i.e., an RE pair) in which a CSI-RS is transmitted are determined depending on each CSI-RS configuration.

When one or two antenna ports are configured for CSI-RS transmission with respect to a specific cell, the CSI-RS is transmitted on radio resources according to a configured CSI-RS configuration among the 20 CSI-RS configurations shown in (a) of FIG. 8.

Likewise, when four antenna ports are configured for CSI-RS transmission with respect to a specific cell, the CSI-RS is transmitted on radio resources according to a configured CSI-RS configuration among the 10 CSI-RS configurations shown in (b) of FIG. 8. Furthermore, when eight antenna ports are configured for CSI-RS transmission with respect to a specific cell, the CSI-RS is transmitted on radio resources according to a configured CSI-RS configuration among the 5 CSI-RS configurations shown in (c) of FIG. 8.

The CSI-RS for each of the antenna ports is transmitted by CDM on the same radio resource for each of two antenna ports (i.e., {15, 16}, {17, 18}, {19, 20}, {21, 22}). For example, although the respective CSI-RS complex symbols are the same for antenna ports 15 and 16, the CSI-RS complex symbols are mapped to the same radio resource by being multiplied by different orthogonal codes (e.g., Walsh code). The complex symbol of the CSI-RS for antenna port 15 is multiplied by [1, 1], and the complex symbol of the CSI-RS for antenna port 16 is multiplied by [1, −1], and the complex symbols are mapped to the same radio resource. This procedure is the same for antenna ports {17, 18}, {19, 20} and {21, 22}.

A UE may detect a CSI-RS for a specific antenna port by multiplying the CSI-RS by code by which a transmitted symbol is multiplied. That is, in order to detect the CSI-RS for the antenna port 15, the UE multiplies the CSI-RS by multiplied code [1 1]. In order to detect the CSI-RS for the antenna port 16, the UE multiplies the CSI-RS by multiplied code [1 −1].

Referring to (a) and (b) of FIG. 8, if CSI-RS configurations correspond to the same CSI-RS configuration index, radio resources according to a CSI-RS configuration having a larger number of antenna ports include radio resources according to a CSI-RS configuration having a smaller number of CSI-RS antenna ports. For example, in the case of a CSI-RS configuration 0, radio resources for eight antenna ports include both radio resources for four antenna ports and radio resources for one or two antenna ports.

Figure 9:
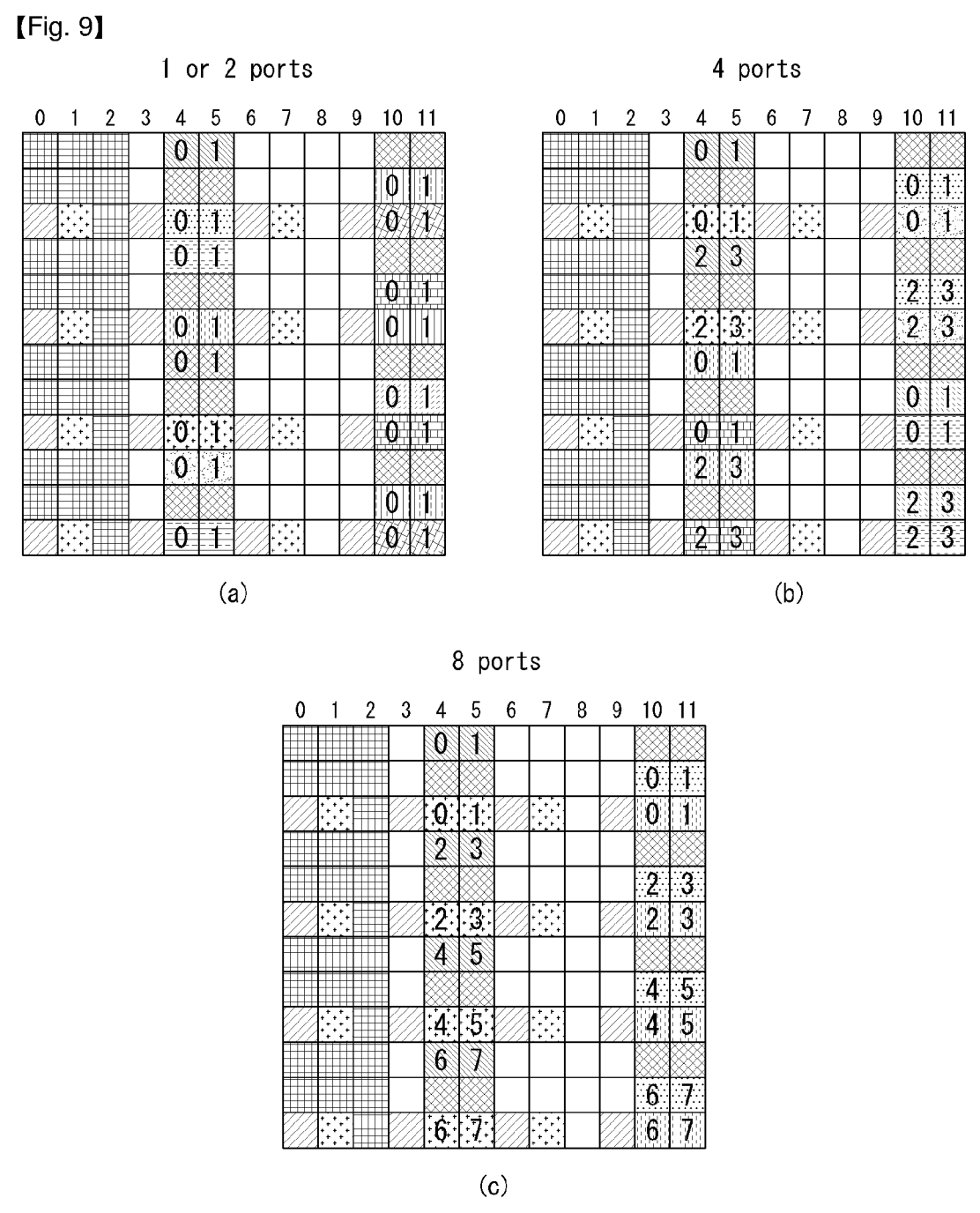

FIG. 9 is a diagram illustrating resources to which reference signals are mapped in a wireless communication system to which the present invention may be applied.

Particularly, FIG. 9 illustrates CSI-RS patterns for 1, 2, 4, or 8 CSI-RS antenna ports within a subframe to which extended CP is applied.

(a) of FIG. 9 shows 16 CSI-RS configurations available for CSI-RS transmission by 1 or 2 CSI-RS antenna ports, (b) of FIG. 8 shows 8 CSI-RS configurations available for CSI-RS transmission by 4 CSI-RS antenna ports, and (c) of FIG. 8 shows 4 CSI-RS configurations available for CSI-RS transmission by 8 CSI-RS antenna ports.

In this way, radio resources (i.e., an RE pair) in which a CSI-RS is transmitted are determined depending on each CSI-RS configuration.

When one or two antenna ports are configured for CSI-RS transmission with respect to a specific cell, the CSI-RS is transmitted on radio resources according to a configured CSI-RS configuration among the 16 CSI-RS configurations shown in (a) of FIG. 9.

Likewise, when four antenna ports are configured for CSI-RS transmission with respect to a specific cell, the CSI-RS is transmitted on radio resources according to a configured CSI-RS configuration among the 8 CSI-RS configurations shown in (b) of FIG. 9. Furthermore, when eight antenna ports are configured for CSI-RS transmission with respect to a specific cell, the CSI-RS is transmitted on radio resources according to a configured CSI-RS configuration among the 4 CSI-RS configurations shown in (c) of FIG. 9. A plurality of CSI-RS configurations may be used in one cell. Only 0 or 1 CSI-RS configuration may be used in a non-zero power (NZP) CSI-RS, and only 0 or several CSI-RS configurations may be used in a zero power (ZP) CSI-RS.

In a ZeroPower (ZP) CSI-RS that is a bitmap of 16 bits configured by a higher layer, a UE assumes zero transmission power in REs (e.g., excluding an RE redundant with an RE that assumes a NZP CSI-RS configured by a higher layer) corresponding to the 4 CSI-RS columns in Table 3 and Table 4 for each bit set to 1. The most significant bit (MSB) corresponds to the lowest CSI-RS configuration index, and the next bit within the bitmap sequentially corresponds to the next CSI-RS configuration index.

The CSI-RS is transmitted only in a downlink slot satisfying the condition of "n_s mod 2" and a subframe satisfying a CSI-RS subframe configuration, as shown in Table 3 and Table 4.

In the case of the frame structure type 2 (TDD), a CSI-RS is not transmitted in a special subframe, a synchronous signal (SS), a subframe that collides against the transmission of a PBCH or SystemInformationBlockType1 (SIB 1) message, or a subframe configured to send a paging message.

Furthermore, an RE in which a CSI-RS for any antenna port belonging to the antenna port set S (S={15}, S={15, 16}, S={17, 18}, S={19, 20} or S={21, 22}) is transmitted is not used to send a PDSCH or a CSI-RS for another antenna port.

Data throughput is reduced as CSI-RS overhead increases because time-frequency resource used to send a CSI-RS cannot be used for data transmission. Accordingly, a CSI-RS is not configured to be transmitted for each subframe, but is configured to be transmitted in each specific transmission period corresponding to a plurality of subframes by taking into consideration the reduction in the data throughput. In this case, CSI-RS transmission overhead can be reduced compared to when a CSI-RS is transmitted in each subframe.

A subframe period for CSI-RS transmission (hereinafter referred to as a "CSI transmission period") T_CSI-RS and a subframe offset Δ_CSI-RS are listed in Table 5 below.

Table 5 illustrates CSI-RS subframe configurations.

TABLE 5

| CSI-RS-SubframeConfig $I_{CSI-RS}$ | CSI-RS periodicity $T_{CSI-RS}$ (subframes) | CSI-RS subframe offset $\Delta_{CSI-RS}$ (subframes) |
| --- | --- | --- |
| 0-4 | 5 | $I_{CSI-RS}$ |
| 5-14 | 10 | $I_{CSI-RS} - 5$ |
| 15-34 | 20 | $I_{CSI-RS} - 15$ |
| 35-74 | 40 | $I_{CSI-RS} - 35$ |
| 75-154 | 80 | $I_{CSI-RS} - 35$ |

Referring to Table 5, a CSI-RS transmission period T_CSI-RS and a subframe offset Δ_CSI-RS are determined by a CSI-RS subframe configuration I_CSI-RS.

In Table 5, the CSI-RS subframe configuration may be set either by the 'SubframeConfig' field or the 'zeroTxPower-SubframeConfig' field. The CSI-RS subframe configuration may be set with respect to a NZP CSI-RS and a ZP CSI-RS separately.

A subframe including a CSI-RS satisfies Equation 13 below.

$$(10n_f + \lfloor n_s/2 \rfloor - \Delta_{CSI-RS}) \bmod T_{CSI-RS} = 0 \quad \text{[Equation 13]}$$

In Equation 13, T_CSI-RS denotes a CSI-RS transmission period, Δ_CSI-RS denotes a subframe offset value, n_f denotes a system frame number, and n_s denotes a slot number.

In the case of a UE in which transmission mode 9 is set for a serving cell, a single CSI-RS resource may be configured in the UE. In the case of a UE in which transmission mode 10 is set for a serving cell, one or more CSI-RS resources may be configured in the UE.

In the current LTE standards, a CSI-RS configuration consists of the number of antenna ports (antennaPortsCount), a subframe configuration (subframeConfig), a resource configuration (resourceConfig), etc., which indicate how many antenna ports the CSI-RS is transmitted from, the period and offset of a subframe in which the CSI-RS is transmitted, and which RE position (i.e., frequency and OFDM symbol index) the corresponding subframe is transmitted in.

For each CSI-RS (resource) configuration, the following parameters may be set through higher layer signaling.

If transmission mode 10 is set, the CSI-RS resource configuration identifier

Number of CSI-RS ports: A parameter indicating the number of antenna ports used for CSI-RS transmission (e.g., 1 CSI-RS port, 2 CSI-RS ports, 4 CSI-RS ports, or 8 CSI-RS ports)

CSI-RS configuration (resourceConfig) (see Table 3 and Table 4): A parameter indicating the position of CSI-RS allocation resource CSI-RS subframe configuration (subframeConfig, i.e., I_CSI-RS) (see Table 5): A parameter for the period and/offset of a subframe in which the CSI-RS is transmitted.

If transmission mode 9 is set, the transmission power (P_C) for CSI feedback: Regarding UE assumption on reference PDSCH transmitted power for CSI feedback CSI-RS, Pc is the assumed ratio of PDSCH EPRE to CSI-RS EPRE when UE derives CSI feedback and takes values in the range of [−8, 15] dB with 1 dB step size.

If transmission mode 10 is set, the transmission power (P_C) for CSI feedback with respect to each CSI process. When the CSI subframe sets C_CSI,0 and C_CSI,1 are set by a higher layer for a CSI process, P_C is set in each CSI subframe set of the CSI process.

Pseudo-random sequence generator parameter (n_ID)

If transmission mode 10 is set, the QCL scrambling identifier (qcl-ScramblingIdentity-r11) for assuming the Quasi Co-Located (QCL) type B UE, the CRS port count (crs-PortsCount-r11), and the higher layer parameter ('qcl-CRS-Info-r11') that includes the MBSFN subframe configuration list (mbsfn-SubframeConfigList-r11) parameter.

When the CSI feedback value obtained by a UE is in the range of [−8, 15] dB, P_C is assumed to be the ratio of PDSCH EPRE to CSI-RS EPRE. Herein, the PDSCH EPRE corresponds to a symbol in which the ratio of PDSCH EPRE to CRS EPRE is ρ_A.

In the same subframe of a serving cell, the CSI-RS and the PMCH are not configured together.

When four CRS antenna ports are configured in frame structure type 2, the CSI-RS configuration index belonging to [20-31] set in the case of the normal CP (refer to Table 3) or [16-27] set in the case of the extended CP (refer to Table 4) is not configured for a UE.

A UE may assume that the CSI-RS antenna port of the CSI-RS resource configuration has the QCL relation with the delay spread, the Doppler spread, the Doppler shift, the average gain, and the average delay.

The UE for which transmission mode 10 and QCL type B are configured may assume that the antenna ports 0 to 3 corresponding to the CSI-RS resource configuration and the antenna ports 15 to 22 corresponding to the CSI-RS resource configuration have the QCL relation with the Doppler spread and the Doppler shift.

For a UE for which transmission mode 1-9 is configured, one ZP CSI-RS resource may be configured for the UE with respect to a serving cell. For a UE for which transmission mode 10 is configured, one or more ZP CSI-RS resources may be configured for the UE with respect to a serving cell.

The following parameters may be configured for each ZP CSI-RS resource configuration through higher layer signaling ZP CSI-RS configuration list (zeroTxPowerResourceConfigList) (See Table 3 and Table 4): A parameter for zero-power CSI-RS configuration ZP CSI-RS subframe configuration (eroTxPowerSubframeConfig, i.e., I_CSI-RS) (I_CSI-RS; see Table 5): A parameter for the period and/or offset of a subframe in which a zero-power CSI-RS is transmitted In the same subframe in a serving cell, the ZP CSI-RS resource and the PMCH are not configured simultaneously.

For a UE for which transmission mode 10 is configured, one or more Channel-State Information-Interference Measurement (CSI-IM) resources may be configured.

The following parameters may be configured for each CSI-IM resource configuration through higher layer signaling.

ZP CSI-RS configuration (see Table 3 and Table 4)

ZP CSI-RS subframe configuration (I_CSI-RS; see Table 5)

The CSI-IM resource configuration is the same as one of the configured ZP CSI-RS resources.

In the same subframe in a serving cell, the CSI-IM resource and the PMCH are not configured simultaneously.

Massive MIMO

Multiple-input multiple-output (MIMO) systems with a large number of antennas, often called massive MIMO, have received much attention as a means to improve the spectral efficiency, energy efficiency, and processing complexity.

In 3GPP, a discussion has been recently initiated regarding massive MIMO systems in order to meet the requirements of spectral efficiency of future mobile communication systems. Massive MIMO is also called Full-Dimension MIMO (FD-MIMO).

In a wireless communication system after LTE Release (Rel)-12, the introduction of an active antenna system (AAS) is taken into consideration.

Unlike in an existing passive antenna system in which an amplifier and an antenna in which the phase and size of a signal can be adjusted have been separated, the AAS means a system in which each antenna is configured to include an active element, such as an amplifier.

The AAS does not require a separate cable, a connector, and other hardware for connecting an amplifier and an antenna depending on use of an active antenna and thus has high efficiency in terms of energy and an operation cost. In particular, the AAS enables an advanced MIMO technology, such as the forming of an accurate beam pattern or 3-dimensional beam pattern in which beam direction and beam width are taken into consideration, because the AAS supports an electronic beam control method for each antenna.

Due to the introduction of an advanced antenna system, such as the AAS, a massive MIMO structure including a plurality of input/output antennas and a multi-dimensional antenna structure is also taken into consideration. For example, as opposed to the existing straight-line antenna array, if a 2-D (2-dimension) antenna array is formed, a 3-dimensional beam pattern may be formed by the active antenna of the AAS.

FIG. 10 illustrates a 2-dimensional active antenna system having 64 antenna elements, in a wireless communication system to which the present invention may be applied.

FIG. 10 illustrates a general 2D (2-dimension) antenna array, and N_t=N_v*N_h antennas may have a square shape as in FIG. 10. Here, N_h denotes the number of antenna columns in a horizontal direction, and N_v denotes the number of antenna rows in a vertical direction.

Using such an antenna array with a 2D structure, radio waves may be controlled both in a vertical direction (elevation) and a horizontal direction (azimuth) so as to control transmission beams on a three-dimensional space.

FIG. 11 illustrates a system that a base station or terminal has a plurality of transmission/reception antennas capable of forming an AAS-based 3D (3-Dimension) beam, in a wireless communication system to which the present invention may applied.

FIG. 11 is a schematic view of the aforementioned example, which illustrates a 3D-MIMO system utilizing a 2-dimensional antenna array (i.e., 2D-AAS).

If the 3D beam pattern is used from the viewpoint of a transmission antenna, semi-static or dynamic beamforming not only in a horizontal direction of a beam but also in a vertical direction may be performed and, for example, applications such as sectorization of a vertical direction may be considered.

In addition, from the viewpoint of a reception antenna, when a received beam is formed using a massive reception antenna, signal power may be increased according to antenna array gain. Accordingly, in uplink, the base station may receive a signal from the UE via a plurality of antennas. At this time, the UE may set its transmit power very low in consideration of gain of a massive reception antenna in order to reduce interference.

FIG. 12 illustrates a two-dimensional antenna system with cross polarization in a wireless communication system to which the present invention may be applied.

A 2D planar antenna array model with polarization taken into account may be schematized as in FIG. 12.

As opposed to the existing MIMO system using passive antennas, a system based on active antennas may dynamically adjust the gain of antenna elements by applying a weight to an active device (e.g., amplifier) attached (or included) to each antenna element. A radiation pattern depends on an antenna arrangement such as the number of antenna elements, antenna spacing, etc., so the antenna system may be modeled at the antenna element level.

The antenna array model illustrated in FIG. 12 may be represented by (M, N, P) which corresponds to parameters characterizing the antenna array structure.

M represents the number of antenna elements with the same polarization in each column (vertical direction) (i.e., the number of antenna elements with a +45° slant in each column or the number of antenna elements with a −45° slant in each column).

N represents the number of columns in horizontal direction (i.e., the number of antenna elements in horizontal direction).

P represents the number of polarization dimensions. As in FIG. 11, P=2 for cross polarization, and P=1 for co-polarization.

Antenna ports may be mapped to physical antenna elements. An antenna port may be defined by a reference signal associated with the corresponding antenna port. For example, in an LTE system, antenna port 0 may be associated with a CRS (Cell-specific Reference Signal), and antenna port 6 may be associated with a (Positioning Reference Signal) PRS.

For example, antenna ports and physical antenna elements may be mapped to each other one-to-one. This applies when a single cross-polarization antenna element is used for downlink MIMO or downlink transmission diversity. For example, antenna port 0 may be mapped to one physical antenna element, and antenna port 1 may be mapped to another physical antenna element. In this case, for the UE, two downlink transmissions exist. One is associated with a reference signal for antenna port 0, and the other is associated with a reference signal for antenna port 1.

In another example, a signal antenna port may be mapped to multiple physical antenna elements. This applies when this antenna port is used for beamforming. In beamforming, downlink transmission may be directed toward a specific UE by using multiple physical antenna elements. Generally, this may be achieved by using an antenna array consisting of multiple columns of multiple cross-polarization antenna elements. In this case, for the UE, a single downlink transmission exists. One is associated with a reference signal for antenna port 0, and the other is associated with a reference signal for antenna port 1.

That is, antenna ports represent downlink transmissions to a UE, rather than actual downlink transmission from a base station through physical antenna elements.

In another example, a plurality of antenna ports are used for downlink transmission, and each antenna port may be mapped to multiple physical antenna elements. This applies when an antenna array is used for downlink MIMO or downlink diversity. For example, antenna ports 0 and 1 each may be mapped to multiple physical antenna elements. In this case, for the UE, two downlink transmissions exist. One is associated with a reference signal for antenna port 0, and the other is associated with a reference signal for antenna port 1.

In FD-MIMO, the MIMO precoding of a data stream goes through antenna port virtualization, transceiver unit (TXRU) virtualization, and an antenna element pattern.

In antenna port virtualization, a stream on an antenna port is precoded on TXRUs. In TXRU virtualization, a TXRU signal is precoded on antenna elements. In an antenna element pattern, a signal radiated from an antenna element may have a directional gain pattern.

In a conventional transceiver modeling, it is assumed that antenna ports and TXRUs are statically mapped one to one, and a TXRU virtualization effect is integrated in a static (TXRU) antenna pattern that includes both the effects of TXRU virtualization and antenna element patterns.

Antenna port virtualization may be performed in frequency-selective manner. In LTE, an antenna port is defined in conjunction with a reference signal (or pilot). For example, for precoded data transmission on an antenna port, a DMRS is transmitted on the same bandwidth as the data signals, and both DMRS and data are precoded with the same precoder (or with the same TXRU virtualization precoding). For CSI estimation, on the other hand, CSI-RS is transmitted on multiple antenna ports. For CSI-RS transmissions, the precoder characterizing the mapping between CSI-RS ports and TXRUx can be designed as a unique matrix to enable a UE to estimate a TXRU virtualization precoding matrix for data precoding vectors.

Two TXRU virtualization methods will be discussed: 1D TXRU virtualization and 2D TXRU virtualization, which will be described below with reference to the drawings.

FIG. 13 illustrates a transceiver unit model in a wireless communication system to which the present invention may be applied.

In 1D TXRU virtualization, M_TXRU TXRUs are associated with only those M antenna elements comprising a column antenna array with the same polarization.

In 2D TXRU virtualization, a TXRU model configuration matching the above antenna array model configuration (M, N, P) of FIG. 12 may be represented by (M_TXRU, N, P). Here, M_TXRU denotes the number of 2D TXRUs present in the same polarization in the same column, and M_TXRU≤M is always satisfied. That is, the total number TXRUs is equal to M_TXRU×N×P.

TXRU virtualization models may be divided into a TXRU virtualization model option-1: sub-array partition model shown in (a) of FIG. 13 and a TXRU virtualization model option-2: full-connection model shown in (b) of FIG. 13, depending on the correlation between an antenna element and a TXRU.

Referring to (a) of FIG. 13, in the case of a sub-array partition model, an antenna element is split into multiple antenna element groups, and each TXRU is connected to one of the groups.

Referring to (b) of FIG. 13, in the case of a full-connection model, signals of multiple TXRUs are combined and delivered to a single antenna element (or antenna element array).

In FIG. 13, q is a transmission signal vector of M co-polarized antenna elements within a column. w is a wideband TXRU virtualization weight vector, and W is a wideband TXRU virtualization weight matrix. X is a signal vector of M_TXRU TXRUs.

Here, antenna ports and TXRUs may be mapped 1-to-1 or 1-to-many.

The TXRU-to-element mapping of FIG. 13 is only an example, and the present invention is not limited to the specific example. The present invention may be equally applied in terms of hardware to the mapping between the TXRU and antenna elements that can be implemented in various other forms.

CSI-RS Transmission Method in General/Special Subframe

As described above with reference to FIG. 1, there is a special subframe composed of three fields of a DwPTS (Downlink Pilot Time Slot), GP (Guard Period), and UpRTS (Uplink Pilot Time Slot) in a TDD system. The length of each field included in the special subframe may be variously set according to the configuration of the special subframe. In the legacy LTE standards, the transmission of CSI-RS in such a special subframe (particularly, DwPTS area/field of the special subframe) is not allowed.

However, through a recent EB/FD-MIMO standardization discussion, it was discussed that the CSI-RS transmission should be allowed in a special subframe for the reason that the mapping of 16-port CSI-RS is impossible in the subframe configuration '0' (namely, in subframe 0, it is not possible to map 16 ports CSI-RS, meaning that in some UL/DL configurations, it is not possible to transmit CSI-RS ports>8). As a result, in the next-generation LTE system, it was determined that ZP and NZP CSI-RS transmission is supported using 2/4/8/12/16 ports in the DwPTS area. Specifically, 8 or more ports CSI-RS transmission is necessary for EB/FD-MIMO operation, and thus the CSI-RS transmission which uses 8 or more ports has become possible at least through DwPTS as the CSI-RS transmission has become possible in DwPTS in the TDD scheme. The CSI-RS pattern as in FIG. 14 has been proposed as a specific embodiment thereabout.

FIG. 14 illustrates resources of a special subframe to which the CSI-RS is mapped in a wireless communication system to which the present invention may be applied. Particularly, FIG. 14 illustrates CSI-RS patterns for the case that the number of CSI-RS antenna ports is 1, 2, 4 or 8 in the special subframe to which a normal cyclic prefix has been applied.

The CSI-RS pattern which is mapped to the special subframe may be designed based on the legacy CSI-RS pattern mapped to the normal subframe, and for example, as illustrated in FIG. 14, the legacy CSI-RS pattern may be designed in the time-shifted form. In addition to the CSI-RS pattern proposed in FIG. 14, the CSI-RS pattern (i.e., RE in which CSI-RS is transmitted/mapped) may be variously designed/suggested.

CSI-RS resource information by RRC signal in the current standards may be provided in the following form.

At this time, assuming that the CSI-RS transmission is set based on Table 5, if the CSI-RS transmission through the special subframe is allowed, ambiguity may occur in the CSI-RS receiving operation of the UE.

For example, it can be assumed that the transmission period of CSI-RS is set to 5 ms, and the uplink-downlink configuration (UL/DL configuration) (see Table 1) in the TDD system is set to 3, 4, or 5. In this case, CSI-RS is transmitted twice within one wireless frame, and this is transmitted through the special subframe (subframe #1) at the first time and is transmitted a normal subframe (subframe #6) at the remaining one time alternately (see Table 1). At this time, if locations of resources (or resource elements) in which CSI-RS is mapped/transmitted depending on the subframe type are different, if the UE does not know the type of the subframe in which the current CSI-RS is transmitted, it is not possible to know the accurate location of the CSI-RS resource, which is a problem.

Hence, the present specification suggests the following three solutions to resolve such a problem.

1. First Embodiment: Method of Setting Restriction not to Generate the Above Problem As the first embodiment, a restriction may be set not to generate the above-described ambiguity/problem.

For example, the UE may be set not to expect a situation in which the above-described ambiguity/problem may be generated. Namely, when it is expected that the CSI-RS is transmitted alternately through different types of subframes

```
CSI-RS-ConfigNZP
The IE CSI-RS-ConfigNZP is the CSI-RS resource configuration using non-zero power
transmission that E-UTRAN may configure on a serving frequency.
                    CSI-RS-ConfigNZP rmation elements
-- ASN1STA
CSI-RS-ConfigNZP-r11 ::=    SEQUENCE {
    csi-RS-ConfigNZPId-r11              CSI-RS-ConfigNZPId-r11,
    antennaPortsCount-r11               ENUMERATED an1, an2, an4, an8},
    resourceConfig-r11                  INTEGER (0..31),
    subframeConfig-r11                  INTEGER (0..154),
    scramblingIdentity-r11              INTEGER (0..503),
    qcl-CRS-Info-r11                    SEQUENCE {
        qcl-ScramblingIdentity-r11      INTEGER (0..503),
        crs-PortsCount-r11                  ENUMERATED n1, n2, n4, spare1},
        mbsfn-SubframeConfigList-r11    CHOICE {
            release                             NULL,
            setup                               SEQUENCE {
                subframeConfigList                  MBSFN-SubframeConfigList
            }
        }
OPTIONAL -- Need ON
    }
OPTIONAL, -- Need OR
    ...
}
-- ASN1STOP
```

Here, 'antennaPortsCount' denotes the number of ports of CSI-RS, 'resourceConfig' denotes the index value (may also be called "parameter (value)") indicating the location of resource elements within the subframe (i.e., specific CSI-RS pattern) in which CSI-RS is mapped/transmitted as illustrated in FIG. 14, and 'subframeConfig' denotes transmission period and offset information of the subframe in which CSI-RS is transmitted. In particular, if 'subframeConfig' is designed in the range of INTEGER (0 . . . 154) like the above, the offset of the subframe where the CSI-RS is transmitted and the transmission period of CSI-RS may be set to the UE in the joint-encoded form as shown in the above Table 5.

in one wireless frame (namely, when the CSI-RS transmission period is 5 ms (or I_CSI-RS is set to 0 to 4), and TDD UL-DL configuration is set to 3, 4 or 5), the UE's corresponding operation thereto may not be specifically defined. As a result, in the situation that such an ambiguity/problem may occur, no operation of the UE may be secured.

Alternatively, the operation of the UE may be clearly defined so that such an ambiguity/problem may not be generated.

For example, in TDD system, with respect to UL-DL configurations 0, 1, 2 and 6, Table 5 may be applied as itself, and with respect to UL-DL configurations 3, 4 and 5, Table 6 below, which is newly designed not to have 5 ms period, may be applied.

TABLE 6

| CSI-RS-SubframeConfig $I_{CSI-RS}$ | CSI-RS periodicity $T_{CSI-RS}$ (subframes) | CSI-RS subframe offset $\Delta_{CSI-RS}$ (subframes) |
|---|---|---|
| 5-14 | 10 | $I_{CSI-RS} - 5$ |
| 15-34 | 20 | $I_{CSI-RS} - 15$ |
| 35-74 | 40 | $I_{CSI-RS} - 35$ |
| 75-154 | 80 | $I_{CSI-RS} - 35$ |

Table 6 illustrates in the form of having removed the lines related with 5 ms period in Table 5 having been applied in the legacy LTE system for the convenience of explanation, but it is obvious that reconfiguration is possible in the form of re-indexing the indexes of i_CSI_RS from '0'.

Namely, as described above, with respect to UL-DL configurations 3, 4 and 5 where the situation in which CSI-RS may be transmitted alternately through different subframe types in one wireless frame, the transmission period of CSI-RS may be defined not to be 5 ms from the beginning. As a result, the situation that CSI-RS is transmitted alternately through different subframe types in one wireless frame may be avoided.

It may be understood that Table 5 in the legacy system is applied as itself, and a restriction that, in I_CSI-RS, 0 to 4 (i.e., CSI-RS transmission period is 5 ms) is not set in the UE has been given. Further, this may be understood that newly designed Table 6 is applied so that CSI-RS transmission period cannot be set to 5 ms. Hence, it may be set that, in I_CSI-RS, 0 to 4 may be deleted from the signaling-possible range or even if they are transmitted to the UE by signaling, the UE can disregard them.

2. Second Embodiment: Method of Granting Priority by Subframe Types

As the second embodiment, when the above ambiguity/problem occurs, it may be defined/set that the UE may recognize that only the CSI-RS transmission in the special subframe is valid by granting a priority to the special subframe (or DwPTS), which is higher than the priority to the normal subframe. In other words, when the UE receives the setting related to CSI-RS transmission in the special subframe (or DwPTS) (through RRC signaling) and the setting that at least part of the CSI-RS to be transmitted from the base station may be transmitted in the normal subframe is provided (e.g., when CSI-RS is set to be transmitted in the normal subframe as well as in the special subframe in one wireless frame through the setting information such as 'subframeConfig') (namely, in the situation that the above-described ambiguity/problem has been generated), the UE may be set to disregard the CSI-RS transmission in the normal subframe and not to measure the corresponding CSI-RS. In other words, when the CSI-RS in one wireless frame is transmitted in a crossover manner through the special subframe and the normal subframe, the UE may measure only the CSI-RS by determining that only the CSI-RS transmitted through the special subframe is valid.

In contrast, in the above situation, the UE may be set/defined to measure only the CSI-RS by determining that only the CSI-RS transmission in the normal subframe is valid. Namely, in the present embodiment, it may be understood that in the situation that the above-described ambiguity/problem has occurred, the UE substantially returns to the legacy operation and measures CSI-RS. In this case, the UE understands location information of CSI-RS transmission resource element such as 'resourceConfig' as information on the normal subframe and does not receive CSI-RS in the special subframe (or DwPTS). Hence, the present embodiment may be understood as a method of setting to put priority on returning to the legacy operation by the UE with respect to the specific situation (or misconfigured situation) that a kind of ambiguity/problem may occur.

3. Third Embodiment: Method of Newly Defining the UE Operation at this Time while Allowing Generation of the Above-Described Ambiguity/Problem As the third embodiment, the above-described ambiguity/problem may be resolved by newly defining the operation of the UE in such a situation while allowing the situation that the above-described ambiguity/problem may occur (e.g., the setting CSI-RS to be transmitted through the special subframe and normal subframe alternately in one wireless frame).

Namely, when a situation that the above-described ambiguity/problem may occur is set (e.g., when CSI-RS transmission period is 5 ms (or I_CSI-RS is set to 0 to 4) and TTD UL-DL configuration is set to 3, 4 or 5), the UE may be set in a manner that the setting about the CSI-RS transmitted from the special subframe (or DwPTS) (or CSI-RS resource information) and the setting about CSI-RS transmitted from the normal subframe (or CSI-RS resource information) are to be differently understood. In other words, the CSI-RS information about the CSI-RS resource received from the base station may be set to be differently understood by subframe types.

To this end, the information indicating CSI-RS pattern/configuration mapped to the special subframe (or DwPTS) may be inserted into Table 3 indicating the legacy CSI-RS configuration/pattern as a new column so as to be newly defined as Table 7 as follows. Both Table 3 and Table 7 correspond to Table indicating CSI-RS pattern/configuration in the subframe to which the general circular prefix has been applied. The line newly added in Table 7 has been written centering on the CSI-RS configuration/pattern of FIG. 14, but the present invention is not limited thereto.

TABLE 7

| | | Number of CSI reference signals configured | | | | | | | | | | | |
|---|---|---|---|---|---|---|---|---|---|---|---|---|---|
| | | 1 or 2 | | | | 4 | | | | 8 | | | |
| | CSI reference | Normal Subframe | | DwPTS with length 11, 12 | | Normal subframe | | DwPTS with length 11, 12 | | Normal subframe | | DwPTS with length 11, 12 | |
| | signal configuration | (k', l') | $n_s$ mod 2 | (k', l') | $n_s$ mod 2 | (k', l') | $n_s$ mod 2 | (k', l') | $n_s$ mod 2 | (k', l') | $n_s$ mod 2 | (k', l') | $n_s$ mod 2 |
| Frame | 0 | (9, 5) | 0 | (9, 2) | 0 | (9, 5) | 0 | (9, 2) | 0 | (9, 5) | 0 | (9, 2) | 0 |
| Structure | 1 | (11, 2) | 1 | (11, 5) | 0 | (11, 2) | 1 | (11, 5) | 0 | (11, 2) | 1 | (11, 5) | 0 |
| type | 2 | (9, 2) | 1 | (9, 5) | 0 | (9, 2) | 1 | (9, 5) | 0 | (9, 2) | 1 | (9, 5) | 0 |
| 1 and 2 | 3 | (7, 2) | 1 | (7, 5) | 0 | (7, 2) | 1 | (7, 5) | 0 | (7, 2) | 1 | (7, 5) | 0 |

TABLE 7-continued

| | | Number of CSI reference signals configured | | | | | | | | | | |
|---|---|---|---|---|---|---|---|---|---|---|---|---|
| | | 1 or 2 | | | | 4 | | | | 8 | | |
| | CSI reference | Normal Subframe | | DwPTS with length 11, 12 | | Normal subframe | | DwPTS with length 11, 12 | | Normal subframe | | DwPTS with length 11, 12 |
| | signal configuration | (k', l') | $n_s$ mod 2 | (k', l') | $n_s$ mod 2 | (k', l') | $n_s$ mod 2 | (k', l') | $n_s$ mod 2 | (k', l') | $n_s$ mod 2 | (k', l') | $n_s$ mod 2 |
| | 4 | (9, 5) | 1 | (9, 2) | 1 | (9, 5) | 1 | (9, 2) | 1 | (9, 5) | 1 | (9, 2) | 1 |
| | 5 | (8, 5) | 0 | (8, 2) | 0 | (8, 5) | 0 | (8, 2) | 0 | | | | |
| | 6 | (10, 2) | 1 | (10, 5) | 0 | (10, 2) | 1 | (10, 5) | 0 | | | | |
| | 7 | (8, 2) | 1 | (8, 5) | 0 | (8, 2) | 1 | (8, 5) | 0 | | | | |
| | 8 | (6, 2) | 1 | (6, 5) | 0 | (6, 2) | 1 | (6, 5) | 0 | | | | |
| | 9 | (8, 5) | 1 | (8, 2) | 1 | (8, 5) | 1 | (8, 2) | 1 | | | | |
| | 10 | (3, 5) | 0 | (3, 2) | 0 | | | | | | | | |
| | 11 | (2, 5) | 0 | (2, 2) | 0 | | | | | | | | |
| | 12 | (5, 2) | 1 | (5, 5) | 0 | | | | | | | | |
| | 13 | (4, 2) | 1 | (4, 5) | 0 | | | | | | | | |
| | 14 | (3, 2) | 1 | (3, 5) | 0 | | | | | | | | |
| | 15 | (2, 2) | 1 | (2, 5) | 0 | | | | | | | | |
| | 16 | (1, 2) | 1 | (1, 5) | 0 | | | | | | | | |
| | 17 | (0, 2) | 1 | (0, 5) | 0 | | | | | | | | |
| | 18 | (3, 5) | 1 | (3, 2) | 1 | | | | | | | | |
| | 19 | (2, 5) | 1 | (2, 2) | 1 | | | | | | | | |
| Frame structure type 2 only | 20 | (11, 1) | 1 | | | (11, 1) | 1 | | | (11, 1) | 1 | | |
| | 21 | (9, 1) | 1 | | | (9, 1) | 1 | | | (9, 1) | 1 | | |
| | 22 | (7, 1) | 1 | | | (7, 1) | 1 | | | (7, 1) | 1 | | |
| | 23 | (10, 1) | 1 | | | (10, 1) | 1 | | | | | | |
| | 24 | (8, 1) | 1 | | | (8, 1) | 1 | | | | | | |
| | 25 | (6, 1) | 1 | | | (6, 1) | 1 | | | | | | |
| | 26 | (5, 1) | 1 | | | | | | | | | | |
| | 27 | (4, 1) | 1 | | | | | | | | | | |
| | 28 | (3, 1) | 1 | | | | | | | | | | |
| | 29 | (2, 1) | 1 | | | | | | | | | | |
| | 30 | (1, 1) | 1 | | | | | | | | | | |
| | 31 | (0, 1) | 1 | | | | | | | | | | |

Table 7 shows a plurality of index values 0 to 31 indicating the location of the resource element to which CSI-RS is mapped. A plurality of index values are defined to indicate locations of different resource elements by subframe types or to indicate only the locations of the resource elements of CSI-RS which is transmitted by normal subframes. Namely, the same index value may be defined to indicate the locations of different resource elements depending on the subframe type. Hence, when the CSI-RS is set to be transmitted alternately through the special subframe and the normal subframe in one wireless frame, the UE may know the accurate location of the CSI-RS resource by additionally considering the type of the subframe where the current CSI-RS is transmitted as well as the received CSI-RS information, from the base station.

For example, it may be assumed that the UE has received CSI-RS resource information in which it is set that the index value (resourceConfig)=3 and the number of antenna ports (antennaPortsCount)=an4. Referring to Table 7, the location of the resource element of CSI-RS is (k', l')=(7, 2) and n_s mode 2=1 in the case of the normal subframe, and (k', l')=(7, 5) and n_s mode 2=0 in the case of the special subframe. Namely, in other words, the location of the CSI-RS resource corresponding to the number of the same antenna ports and the same index value may be different depending on the subframe type.

Hence, when the UE receives the CSI-RS alternately through different frame types in one wireless frame, the type of the subframe where the CSI-RS is currently transmitted may be considered as well as the index value and the number of antenna ports (i.e., CSI-RS resource information) in order to obtain the accurate location of the CSI-RS resource. The type of such a subframe may be determined based on the UL-DL configuration information which is set in the UE and the offset information and period of the subframe included in the CSI-RS information.

Hence, in the case of the above example, if the UE tries to receive/measure the CSI-RS transmitted through the normal subframe in one wireless frame, the CSI-RS 4 port at the CSI-RS resource location corresponding to (k', l')=(7, 2) and n_s mode 2=1 is received/measured, and if the UE tries to receive/measure CSI-RS transmitted through the special subframe, the CSI-RS 4 port at the CSI-RS resource location corresponding to (k', l')=(7, 5) and n_s mode 2=0 may be measured.

Namely, in order to avoid the above-described ambiguity/problem, the base station may direct two different CSI-RS resource element pattern information sets by subframe types to the UE through the single 'resourceConfig (index value)' in the state that the CSI-RS transmission time point and/or CSI-RS resource location setting, etc. are set not to have a problem in the CSI-RS resource allocation. As a result, the complexity of the signaling for directing the CSI-RS resource location by the UE is reduced, and the base station may direct differently defined CSI-RS transmission location/pattern even while providing one 'resourceConfig (index value)' to the UE.

The location of the CSI-RS resource element transmitted in the newly added special subframe in Table 7 may be defined in the time-shifted form from the location of the CSI-RS resource element transmitted in the normal subframe. Specifically, it may be assumed that the index value indicates the location of the first CSI-RS resource element for the case that the subframe where the CSI-RS is transmitted is the normal subframe and indicates the location of the second CSI-RS resource element for the case that the subframe is the special subframe. In this case, the location of the second CSI-RS resource element may be defined in the time-shifted form from the location of the first CSI-RS resource element. In particular, the location of the second CSI-RS resource element may be defined in the time-shifted form by as much as the length of n (e.g., n=3 or 4) OFDM symbols from the location of the first CSI-RS resource element.

As an additionally suggested technology to the present embodiment, CSI-RS transmission in both the special subframe and the normal subframe in one wireless frame may be allowed, and the special subframe where the CSI-RS may be transmitted may be limited to the specific special subframe. Specifically, when the CSI-RS is transmitted alternately through the general and special subframes in one wireless frame, the CSI-RS may be set to be transmitted only through the special subframe (or DwPTS) composed of a length greater than a specific length.

For example, CSI-RS transmission in DwPTS having the length of 11 or 12 is allowed as in FIG. 14A, but the CSI-RS transmission in DwPTS of the length less than 11 may be not allowed as in FIG. 14B. In other words, it may be understood that CSI-RS transmission is not allowed for the special subframe having the length in which only the maximum two 8-port CSI-RS patterns may be mapped.

As another example, the transmission in special subframe configurations 0, 5 and 9 (i.e., the special subframe having DwPTS of a small length) may be set not to be allowed, and the transmission only in the special subframe configurations 1-4 and 6-8 (i.e., the special subframe having the DwPTS of a large length) may be set to be allowed (see Table 2).

Here, "set not to be allowed" may mean restricting setting so that the situation that CSI-RS is transmitted alternately in the special subframe of less than a specific length together with the normal subframe in one frame through the setting by 'subframeConfig', etc. as in the first embodiment. Further, "set not to be allowed" may also mean the UE gives a priority higher than the special subframe of less than a specific length in the normal subframe so as to receive/measure CSI-RS only through the normal subframe as in the second embodiment in the situation that the CSI-RS is transmitted alternately in the special subframe of a length less than a specific length together with the normal subframe in one frame. In this case, in the situation that CSI-RS is transmitted alternately in the special subframe of a length less than a specific length together with the normal subframe in one frame, the UE may receive CSI-RS in consideration of CSI-RS information and subframe type as illustrated in the third embodiment.

FIG. 15 is a flowchart illustrating a method of receiving CSI-RS by a UE according to an embodiment of the present invention. With respect to this flowchart, the description on the above-described embodiments may be applied in the same or similar manner, and the repeated description will be omitted.

First, the UE may receive CSI-RS resource information about the CSI-RS resource location where CSI-RS is mapped from the base station (S1510). Here, the CSI-RS resource information may include the index value indicating the location of the CSI-RS resource element where the CSI-RS is transmitted, the period and offset information of the subframe where the CSI-RS is transmitted, and the number of antenna ports where the CSI-RS is transmitted.

Next, the UE may receive the CSI-RS through the CSI-RS resource at the determined location based on the CSI-RS resource information received from the base station (S1520). At this time, when the index value of the received CSI-RS information indicates the location of different CSI-RS resource elements by types of subframe where the CSI-RS is transmitted and the CSI-RS is set to be transmitted alternately through the normal subframe and the special subframe in one wireless frame, the UE may check/recognize/select/determine/obtain the location of the CSI-RS resource in additional consideration of the type of the subframe where CSI-RS is transmitted in addition to the CSI-RS resource information. Further, the UE receives/measures CSI-RS at the location of the checked/recognized/selected/determined/obtained CSI-RS resource.

Here, the case that the CSI-RS is transmitted alternately through the normal subframe and the special subframe in one wireless frame may correspond to the case that the UL-DL configurations are set to 3, 4 or 5 and the transmission period of CSI-Rs is set to 5 ms.

When the index value indicates the location of the first CSI-Rs resource element for the case that the subframe where CSI-RS is transmitted is a normal subframe and the index value indicates the location of the second CSI-RS resource element for the case that the subframe is a special subframe where the CSI-RS is transmitted, the location of the second CSI-RS resource element may be defined in the time-shifted form from the location of the first CSI-RS resource element. For example, the location of the second CSI-RS resource element may be defined as the time-shifted form by as much as the length of the 4 OFDM symbols from the location of the first CSI-RS resource element.

Further, the CSI-RS may be transmitted only through a special subframe of a length equal to or greater than a predetermined length. For example, the CSI-RS is not transmitted at special subframe configurations 0, 5 and 9, but the CSI-RS may be transmitted at special subframe configurations 1-4 and 6-9.

Further, the normal subframe or special subframe where CSI-RS is transmitted may correspond to a subframe to which a normal cyclic prefix has been applied.

General Apparatus to which an Embodiment of the Present Invention May be Applied FIG. 16 illustrates a block diagram of a wireless communication apparatus according to an embodiment of the present invention.

Referring to FIG. 16, the wireless communication system includes an eNB 1610 and a plurality of pieces of UE 1620 located within the area of the eNB 1610.

The eNB 1610 includes a processor 1611, memory 1612, and a radio frequency (RF) unit 1613. The processor 1611 implements the functions, processes and/or methods proposed in FIGS. 1 to 15. The layers of a wireless interface protocol may be implemented by the processor 1611. The memory 1612 is connected to the processor 1611 and stores various pieces of information for driving the processor 1611. The RF unit 1613 is connected to the processor 1611 and transmits and/or receives a radio signal.

The UE 1620 includes a processor 1621, memory 1622, and an RF unit 1623. The processor 1621 implements the functions, processes and/or methods proposed in FIGS. 1 to 16. The layers of a wireless interface protocol may be implemented by the processor 1621. The memory 1622 is connected to the processor 1621 and stores various pieces of information for driving the processor 1621. The RF unit 1623 is connected to the processor 1621 and transmits and/or receives a radio signal.

The memory 1612, 1622 may be inside or outside the processor 1611, 1621 and connected to the processor 1611, 1621 by various well-known means. Furthermore, the eNB 1610 and/or the UE 1620 may have a single antenna or multiple antennas.

In the aforementioned embodiments, the elements and characteristics of the present invention have been combined in specific forms. Each of the elements or characteristics may be considered to be optional unless otherwise described explicitly. Each of the elements or characteristics may be implemented in such a way as to be not combined with other elements or characteristics. Furthermore, some of the elements and/or the characteristics may be combined to form an embodiment of the present invention. The order of the operations described in connection with the embodiments of the present invention may be changed. Some of the elements or characteristics of an embodiment may be included in another embodiment or may be replaced with corresponding elements or characteristics of another embodiment. It is evident that an embodiment may be constructed by combining claims not having an explicit citation relation in the claims or may be included as a new claim by amendments after filing an application.

An embodiment of the present invention may be implemented by various means, for example, hardware, firmware, software or a combination of them. In the case of implementations by hardware, an embodiment of the present invention may be implemented using one or more application-specific integrated circuits (ASICs), digital signal processors (DSPs), digital signal processing devices (DSPDs), programmable logic devices (PLDs), field programmable gate arrays (FPGAs), processors, controllers, microcontrollers and/or microprocessors.

In the case of an implementation by firmware or software, an embodiment of the present invention may be implemented in the form of a module, procedure, or function for performing the aforementioned functions or operations. Software code may be stored in memory and driven by a processor. The memory may be located inside or outside the processor, and may exchange data with the processor through a variety of known means.

It is evident to those skilled in the art that the present invention may be materialized in other specific forms without departing from the essential characteristics of the present invention. Accordingly, the detailed description should not be construed as being limitative from all aspects, but should be construed as being illustrative. The scope of the present invention should be determined by reasonable analysis of the attached claims, and all changes within the equivalent range of the present invention are included in the scope of the present invention.

MODE FOR INVENTION

Various modes for invention have been explained in the best mode for invention.

INDUSTRIAL APPLICABILITY

Although the present invention has been described with reference to examples applied to the 3GPP LTE/LTE-A system, it is applicable to various wireless communication systems other than the 3GPP LTE/LTE-A system.

The invention claimed is:

1. A method of receiving a channel state information-reference signal (CSI-RS) by a user equipment (UE) in a wireless communication system, the method comprising:
receiving, from a base station(BS), an uplink-downlink configuration,
receiving, from the BS, resource control information related to a CSI-RS,
wherein the resource control information includes index information for a location value of the CSI-RS;
receiving, from the BS, the CSI-RS based on the resource control information; and
reporting, to the BS, channel state information measured based on the CSI-RS;
wherein the CSI-RS is received by the UE on two subframes of a radio frame,
wherein the CSI-RS is received by the UE on a special subframe of the radio frame and a normal subframe of the radio frame,
wherein a position of the special subframe and the normal subframe in the radio frame is determined based on the uplink-downlink configuration,
wherein the special subframe is an n-th (#n) subframe of the radio frame and the normal subframe is an #n+5 subframe of the radio frame, and
wherein the index information is determined differently based on whether the subframe is a normal subframe or a special subframe.

2. The method of claim 1, wherein the resource control information further includes (i) subframe information for a period and offset value of a subframe when the CSI-RS is transmitted and (ii) antenna port information for a number of antenna ports where the CSI-RS is transmitted.

3. The method of claim 2, wherein the special subframe is a subframe for both downlink transmission and uplink transmission and the normal subframe is a subframe for downlink transmission.

4. The method of claim 1, wherein n is 2.

5. The method of claim 2,
wherein, based on the CSI-RS being transmitted on the normal subframe, the location value is a location value of a first CSI-RS resource element, and
wherein, based on the CSI-RS being transmitted on the special subframe, the location value is a location of a second CSI-RS resource element, and
wherein the location of the second CSI-RS resource element is defined as time-shifted from the location of the first CSI-RS resource element.

6. The method of claim 5, wherein the location of the second CSI-RS resource element is defined as time-shifted by a length of 4 OFDM symbols from the location of the first CSI-RS resource element.

7. The method of claim 1, wherein the CSI-RS is transmitted only through the special subframe of a length equal to or greater than a predetermined length.

8. The method of claim 1, wherein the normal subframe or the special subframe corresponds to a subframe to which a normal cyclic prefix is applied.

9. The method of claim 2, wherein the period is 5 milliseconds.

10. A user equipment (UE) for receiving a channel state information-reference signal (CSI-RS) in a wireless communication system, the user equipment comprising:
a transceiver configured to transmit and receive a wireless signal; and
a processor configured to control the transceiver, wherein the UE is further configured to:
receive, from a base station(BS), an uplink-downlink configuration, receive, from the BS, resource control information related to a CSI-RS, wherein the resource control information index information is for a location value of the CSI-RS; and report, to the BS, channel state information measured based on the CSI-RS;

wherein the CSI-RS is received by the UE on two subframes of a radio frame, wherein the CSI-RS is received by the UE on a special subframe of the radio frame and a normal subframe of the radio frame, wherein a position of the special subframe and the normal subframe in the radio frame is determined based on the uplink-downlink configuration, wherein the special subframe is an n-th (#n) subframe of the radio frame and the normal subframe is an #n+5 subframe of the radio frame, and the index information is determined differently based on whether the subframe is the normal subframe or the special subframe.

11. The UE of claim 10, wherein the resource control information includes (i) subframe information for a period and offset value of a subframe when the CSI-RS is transmitted and (ii) antenna port information for a number of antenna ports where the CSI-RS is transmitted.

12. The UE of claim 10, wherein the special subframe is a subframe for both downlink transmission and uplink transmission and the normal subframe is a subframe for downlink transmission.

13. The UE of claim 10, wherein n is 2.

14. The UE of claim 11, wherein, based on the CSI-RS being transmitted on the normal subframe, the location value is a location value of a first CSI-RS resource element, and wherein, based on the CSI-RS being transmitted on the special subframe, the location value is a location of a second CSI-RS resource element, and wherein the location of the second CSI-RS resource element is defined as time-shifted from the location of the first CSI-RS resource element.

15. The UE of claim 14, wherein the location of the second CSI-RS resource element is defined as time-shifted by a length of 4 OFDM symbols from the location of the first CSI-RS resource element.

16. The UE of claim 10, wherein the CSI-RS is transmitted only through the special subframe of a length equal to or greater than a predetermined length.

17. The UE of claim 10, wherein the normal subframe or the special subframe corresponds to a subframe to which a normal cyclic prefix is applied.

18. The UE of claim 11, wherein the period is 5 milliseconds.

* * * * *